US008870476B2

(12) United States Patent
Horade

(10) Patent No.: US 8,870,476 B2
(45) Date of Patent: Oct. 28, 2014

(54) IMAGE RECORDING APPARATUS

(75) Inventor: Kenta Horade, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 273 days.

(21) Appl. No.: 13/188,019

(22) Filed: Jul. 21, 2011

(65) Prior Publication Data

US 2012/0081716 A1 Apr. 5, 2012

(30) Foreign Application Priority Data

Sep. 30, 2010 (JP) ................................ 2010-221849

(51) Int. Cl.
*B41J 11/44* (2006.01)
*G03G 15/00* (2006.01)
*G06K 15/16* (2006.01)

(52) U.S. Cl.
CPC ............ *G06K 15/16* (2013.01); *G03G 15/6561* (2013.01); *G03G 15/6573* (2013.01)
USPC .............. 400/76; 400/582; 101/485; 347/104

(58) Field of Classification Search
USPC ....................... 400/76, 582; 101/485; 347/104
See application file for complete search history.

(56) References Cited

U.S. PATENT DOCUMENTS

| 5,167,409 | A | * | 12/1992 | Higeta ........................... 271/225 |
| 5,678,159 | A | * | 10/1997 | Williams et al. ............... 399/395 |
| 5,715,514 | A | * | 2/1998 | Williams et al. ............... 399/395 |
| 6,898,382 | B2 | * | 5/2005 | Shibaki ........................... 399/16 |
| 7,971,953 | B2 | * | 7/2011 | Ishii et al. ........................ 347/16 |
| 2002/0048475 | A1 | * | 4/2002 | Kojima ........................... 399/405 |
| 2004/0126162 | A1 | * | 7/2004 | Nishino et al. ................. 399/395 |
| 2005/0163553 | A1 | * | 7/2005 | Cercos et al. .................. 400/636 |
| 2006/0171725 | A1 | * | 8/2006 | Ruthenberg et al. ............ 399/16 |
| 2006/0203025 | A1 | * | 9/2006 | Nakata et al. .................... 347/16 |
| 2007/0003352 | A1 | * | 1/2007 | Koga et al. ..................... 400/582 |
| 2008/0069578 | A1 | * | 3/2008 | Nakagawa et al. ............. 399/45 |
| 2008/0289527 | A1 | * | 11/2008 | Pasuch et al. ................. 101/474 |

(Continued)

FOREIGN PATENT DOCUMENTS

| JP | HEI 5-68146 A | 3/1993 |
| JP | HEI 6-86945 U | 12/1994 |

(Continued)

OTHER PUBLICATIONS

Partial English-language translation of Japanese Utility Model Patent No. JP HEI 6-86945 U, dated Dec. 20, 1994.

*Primary Examiner* — David Banh
(74) *Attorney, Agent, or Firm* — Scully, Scott, Murphy & Presser, PC

(57) ABSTRACT

An image recording apparatus is provided. The image recording apparatus includes a first conveyer to convey a recording medium in a first direction, a recording unit to record the image on the recording medium, a second conveyer including a first roller pair with a first driving roller and a first driven roller, an image position detector to detect a position of the formed image along a second direction within the recording medium, a rotation rate setting unit to set a rotation rate of the first driving roller based on the detected position of the formed image when a part of the formed image on the recording medium is nipped by the first roller pair, and a controller to control the first driving roller to rotate in the rotation rate set by the rotation rate setting unit and convey the recording medium by the first roller pair.

18 Claims, 16 Drawing Sheets

(56) References Cited

U.S. PATENT DOCUMENTS

| | | | |
|---|---|---|---|
| 2009/0003908 A1* | 1/2009 | Horade | 399/395 |
| 2009/0196662 A1* | 8/2009 | Boness et al. | 399/301 |
| 2009/0219322 A1 | 9/2009 | Terada | |
| 2009/0220873 A1* | 9/2009 | Enomoto | 430/30 |

FOREIGN PATENT DOCUMENTS

| | | |
|---|---|---|
| JP | HEI 11-88654 A | 3/1999 |
| JP | 2003-205654 A | 7/2003 |
| JP | 2005-246727 A | 9/2005 |
| JP | 2009-208273 A | 9/2009 |

* cited by examiner

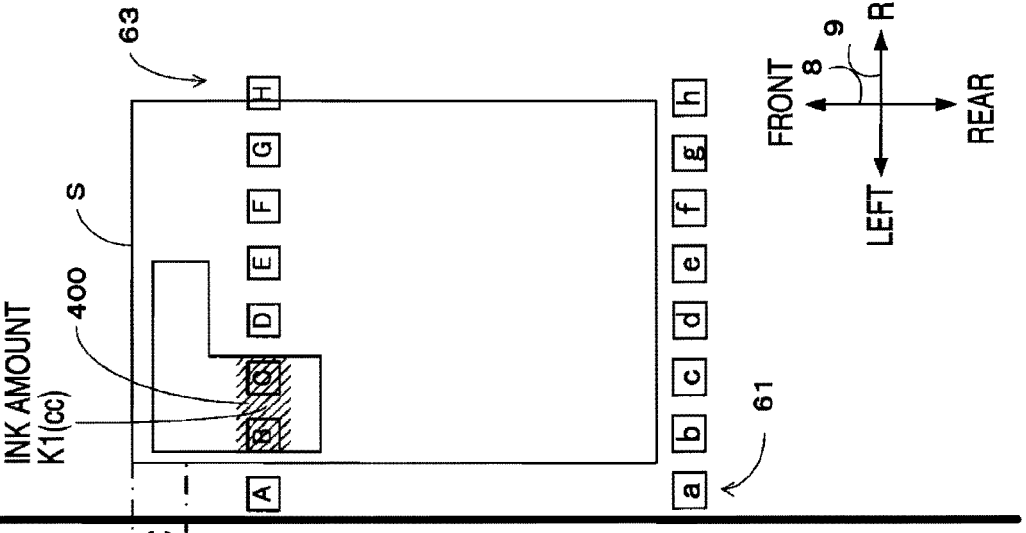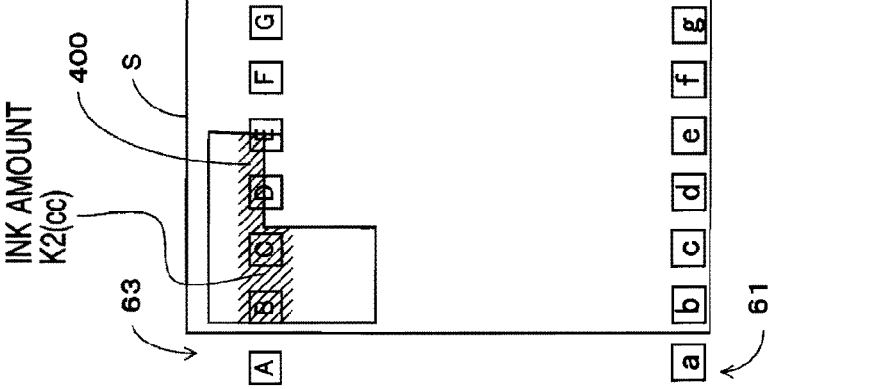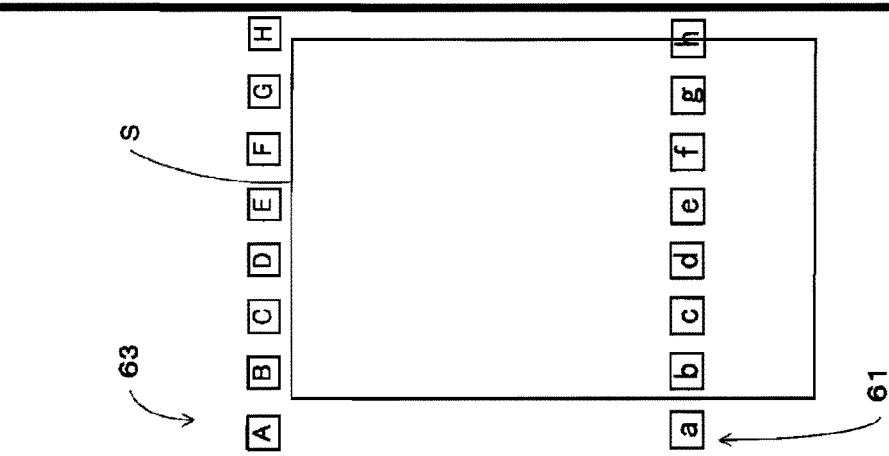

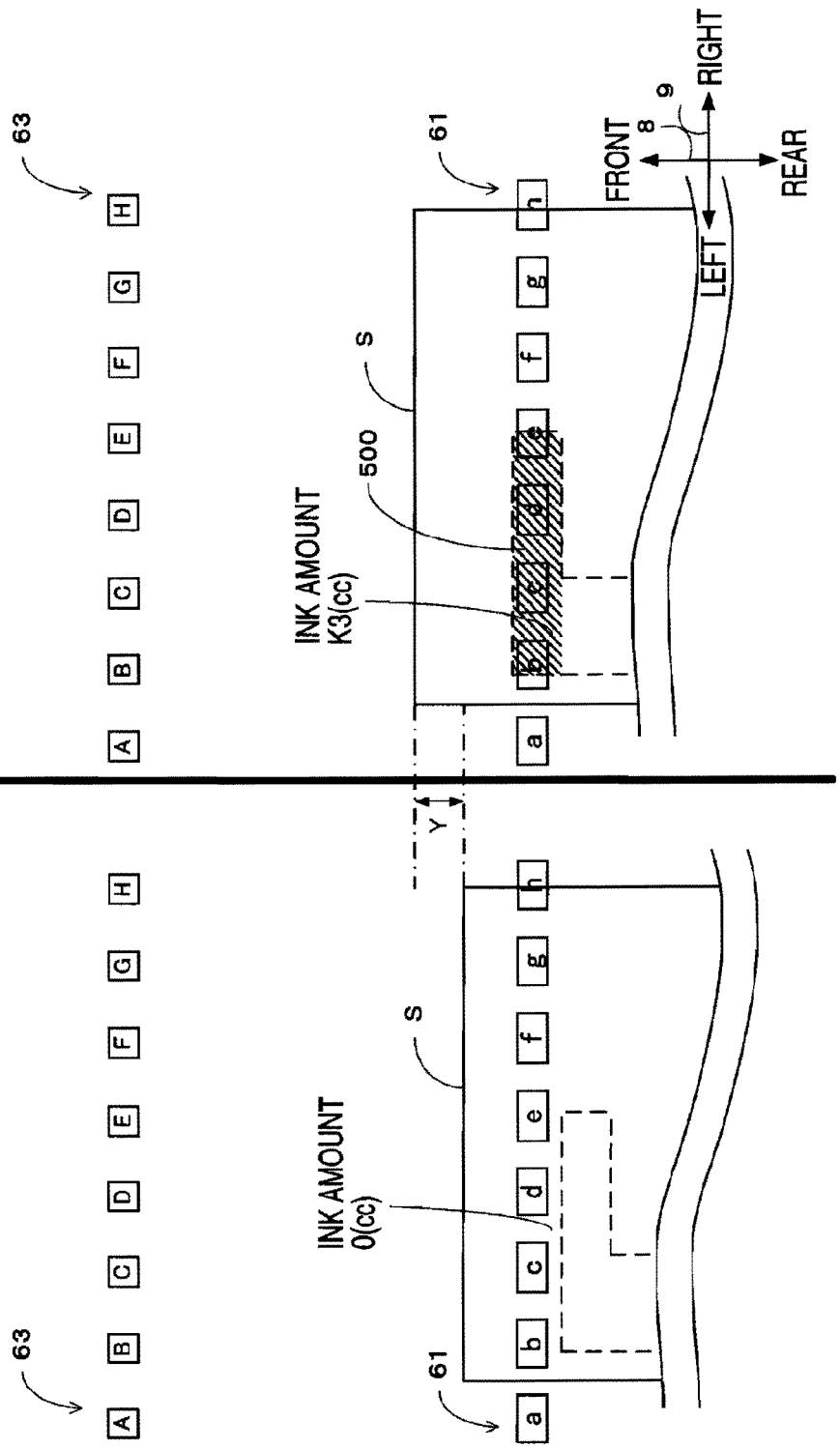

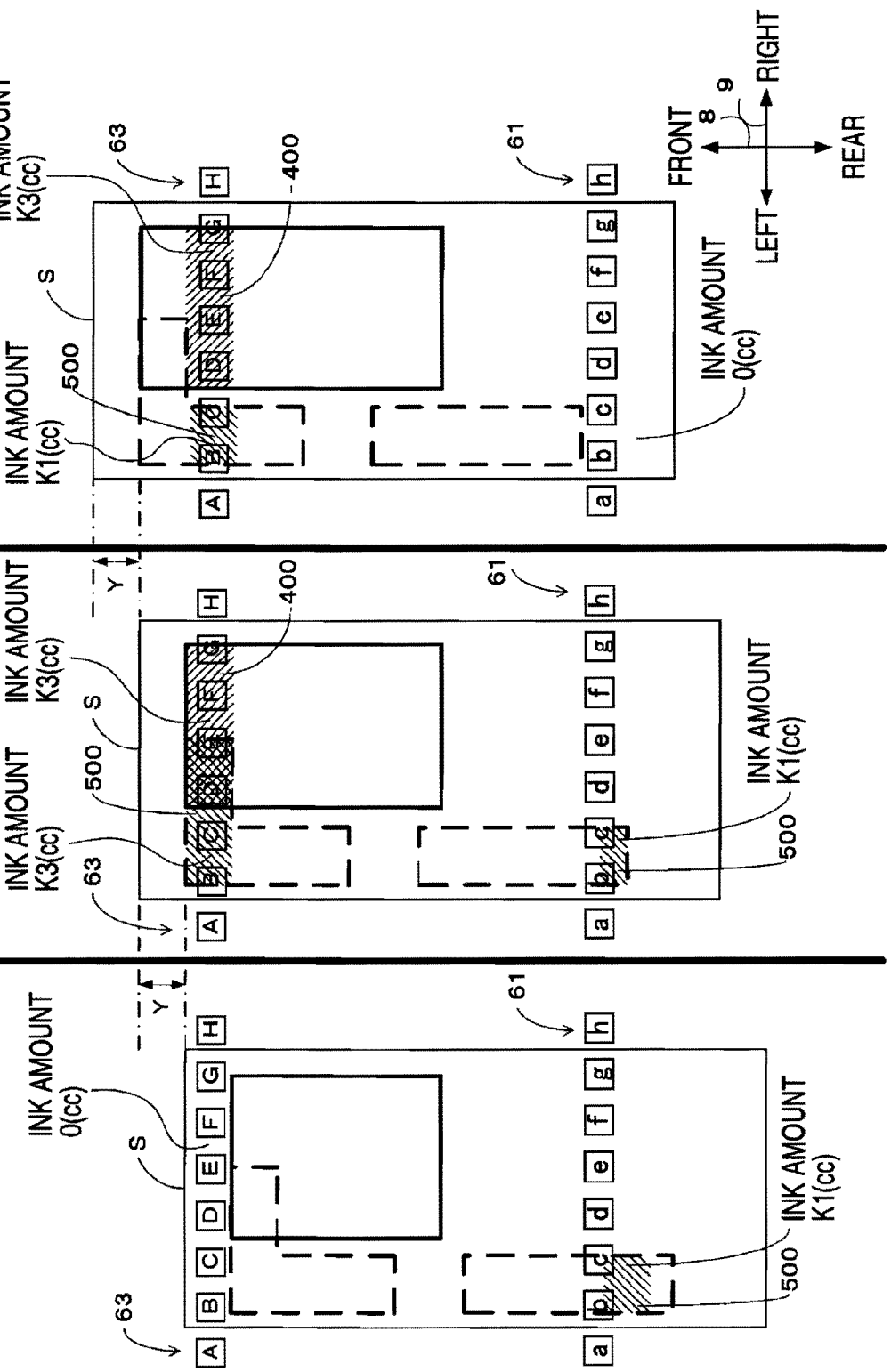

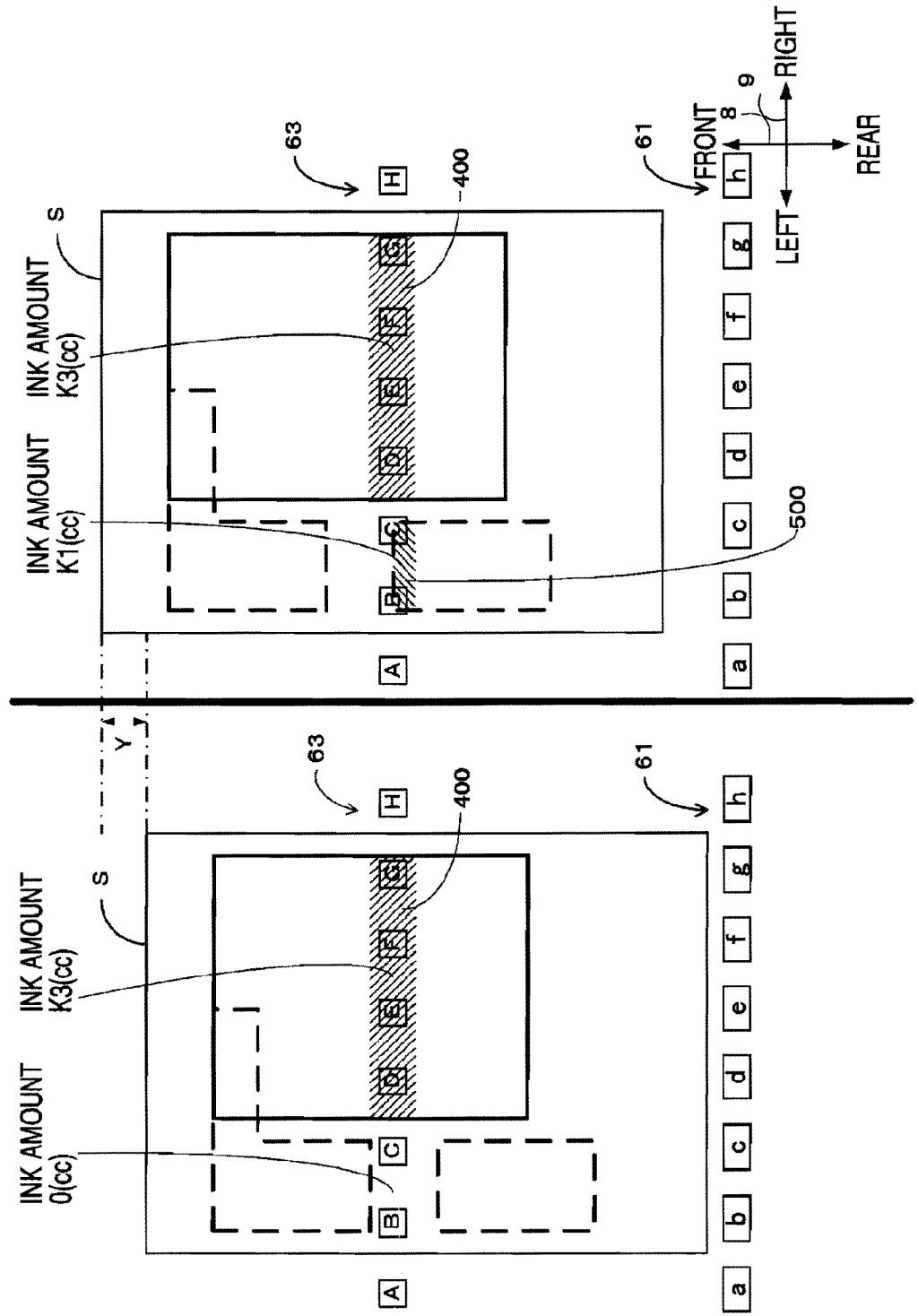

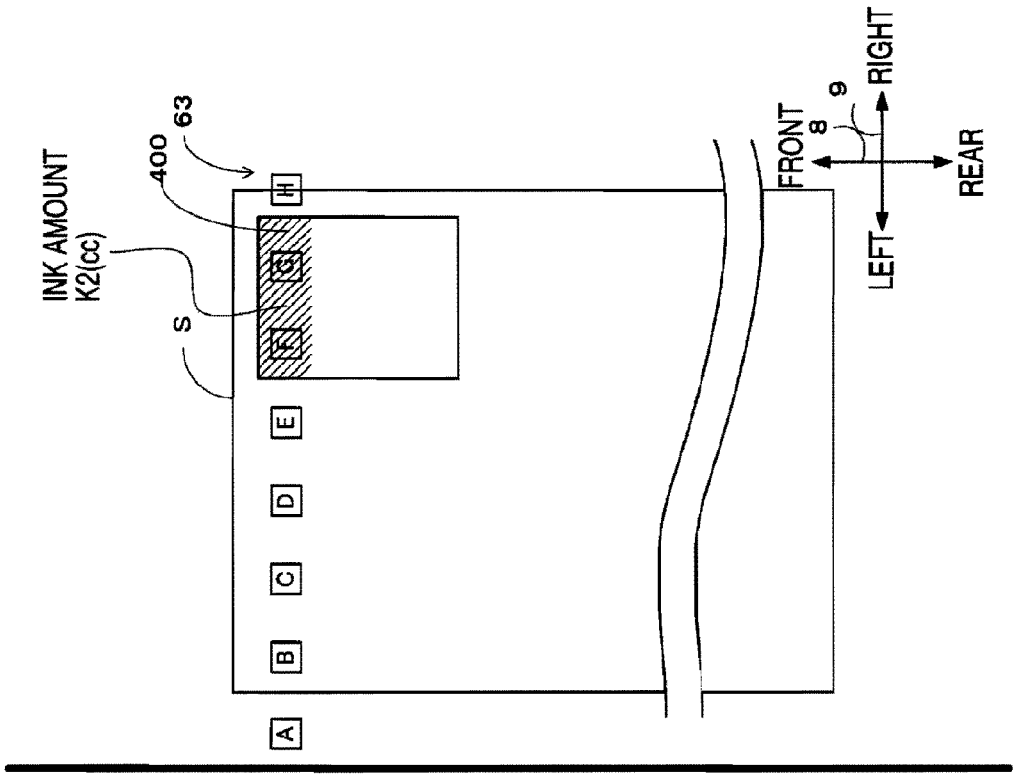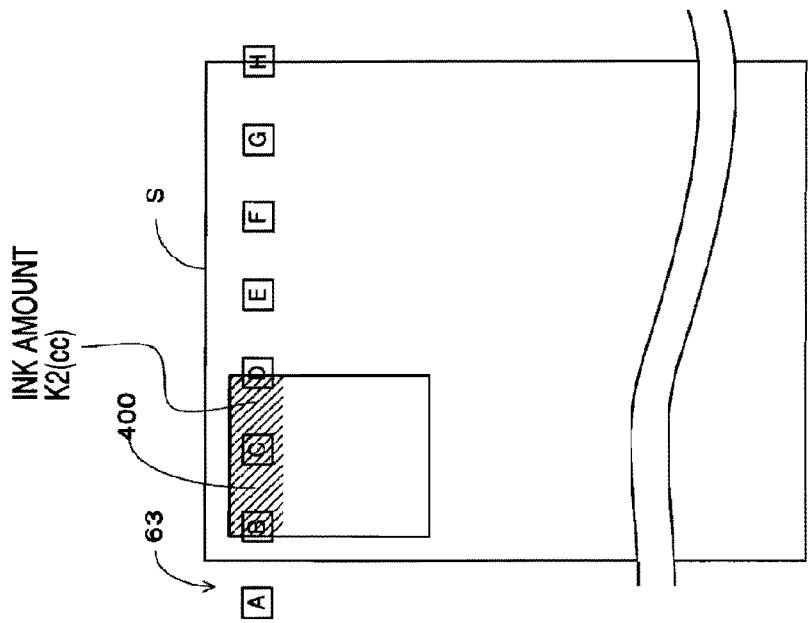

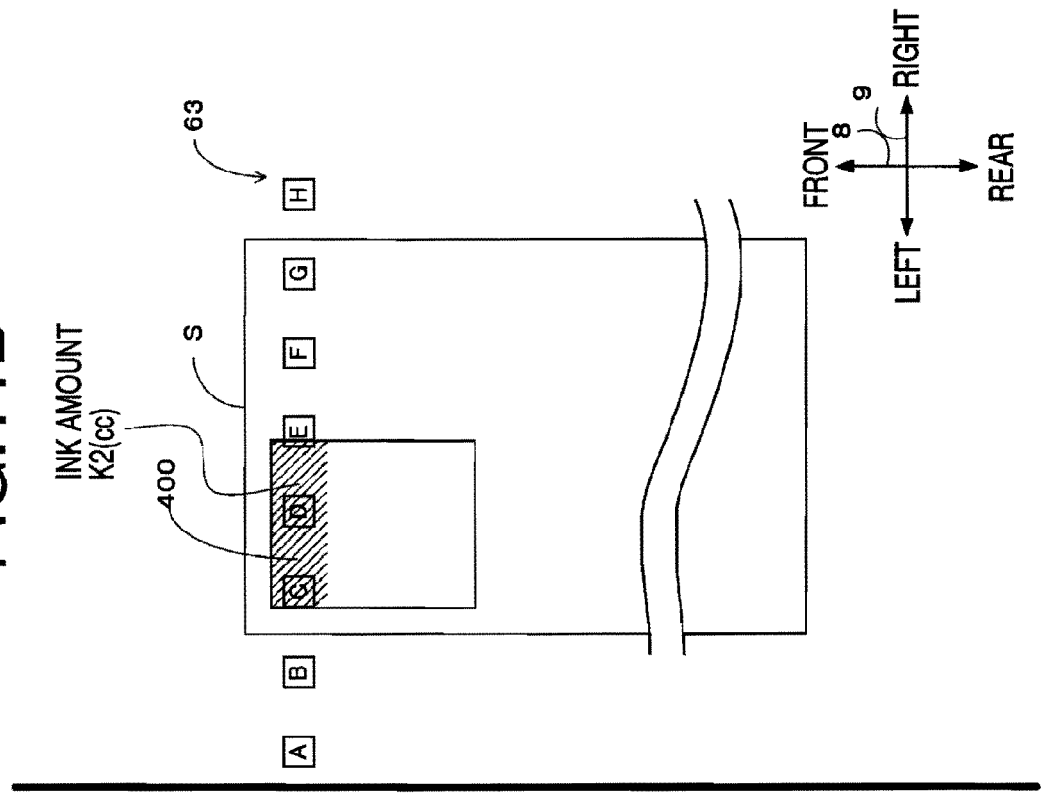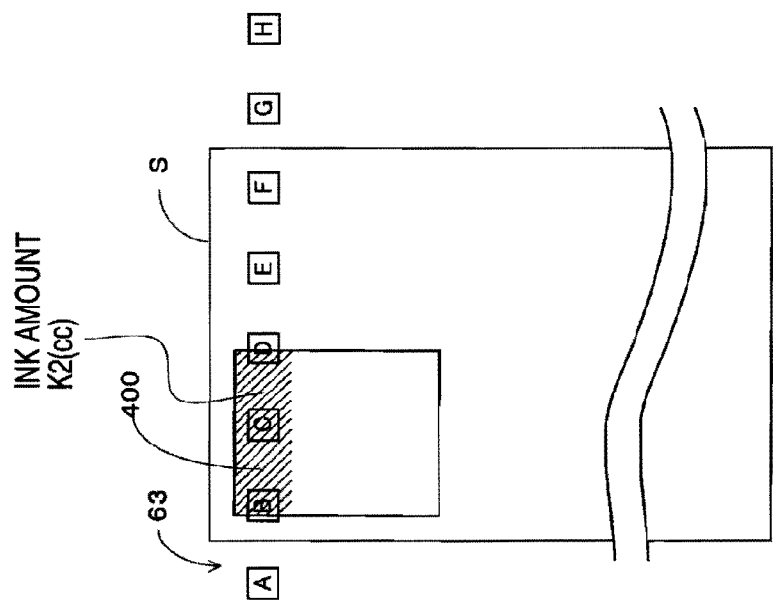

IMAGE RECORDING APPARATUS

CROSS REFERENCE TO RELATED APPLICATION

This application claims priority from Japanese Patent Applications No. 2010-221849, filed on Sep. 30, 2010, the entire subject matter of which is incorporated herein by reference.

BACKGROUND

1. Technical Field

An aspect of the present invention relates to an image recording apparatus, which is capable of recording an image on a recording medium being carried by a conveyer unit. More specifically, the present invention relates to control of a rotation rate of a driving roller in the conveyer unit of an image recording apparatus.

2. Related Art

An image recording apparatus, such as a printer, a copier, and a facsimile machine, often includes a conveyer unit to convey a recording medium (e.g., sheets of paper) and a recording unit to form an image on the recording medium being conveyed by the conveyer unit. The conveyer unit may include a pair of conveyer rollers, which nip the recording medium in between and convey the recording medium toward the recording unit, and a pair of discharge rollers, which nip and convey the recording sheet with the image formed thereon to an outlet of the image recording apparatus. The discharge roller pair may be arranged in a downstream position with respect to the conveyer roller pair along a direction of conveyance of the recording medium. Each of the roller pairs may include a driving roller, which is rotated by driving source from a driving motor, and a driven roller, which is arranged in an opposite position from the driving roller to be driven according to the rotation of the driving roller. The recording medium is nipped between the driving roller and the driven roller to be carried as the driving roller rotates in a predetermined direction.

When the image is formed on the recording medium in the image recording apparatus, recording agent or colorant adheres onto a surface of the recording medium to form the image. Due to the adherence of the colorant, conditions (e.g., wetness) of the recording medium tend to be different between before and after the image forming operation. Therefore, the recording medium with the printed image may not be carried by the discharge rollers similarly to the unprinted recording medium being conveyed by the conveyer rollers. In other words, if the recording medium with the printed image is carried by the discharge roller pair in a same rotating setting as a rotating setting of the conveyer roller pair, the recording sheet may not be carried accurately in a preferred conveying rate.

More specifically, in a downstream section along the conveying path in the image recording apparatus with respect to the recording unit, the recording medium is nipped by the discharge roller pair to be conveyed further toward a most downstream section (i.e., the outlet) of the image recording apparatus. Therefore, when a part of the recording medium with the image formed thereon reaches the discharge roller pair, the image-formed part of the recording medium is nipped by the discharge roller pair. In other words, the colorant forming the image may be nipped by the discharge roller pair together with the recording medium. Thus, conditions in the recording medium are different between the image-formed and a part without any image due to the adherence or wetness of the colorant. In this regard, friction force caused in between the discharge roller pair with the image-formed part of the recording medium tends to be different from friction force caused in between a part of the recording medium with no image.

SUMMARY

When the friction force varies, an amount of the recording medium to be carried by the discharge roller pair tends to be different from the image-formed part and the part with no image. Therefore, when the image-formed part is carried in a speed rate, which is adapted to carry the part with no image, the image-formed part does not match the preferred conveying setting. In other words, the conveying accuracy may not be maintained depending on the parts, which may or may not have an image in the recording medium, and image forming quality of the image recording apparatus may be deteriorated.

In view of the above deficiency, the present invention is advantageous in that an image recording apparatus, which is capable of adjusting rotation rates of the driving rollers of the discharge and/or conveyer roller pair(s) according to a position of the image-formed part in the recording medium being conveyed in order to improve the conveying accuracy and maintaining the image forming quality, is provided.

According to an aspect of the present invention, an image recording apparatus to form an image on a recording medium in a recording agent is provided. The image recording apparatus includes a first conveyer, which is configured to convey the recording medium in a first direction, a recording unit, which is arranged in a downstream position with respect to the first conveyer along the first direction and configured to record the image on the recording medium being conveyed by the first conveyer, a second conveyer, which is arranged in a downstream position with respect to the recording unit along the first direction, includes a first roller pair to nip the recording medium, the first roller pair including a first driving roller to receive driving force from a drive source and a first driven roller arranged in a position opposite from the first driving roller, and is configured to have the first driving roller rotated by the driving force to convey the image-formed recording medium being nipped by the first roller pair, an image position detector, which is configured to detect a position of the formed image along a second direction within the recording medium, the second direction being orthogonal to the first direction, a rotation rate setting unit, which is configured to set a rotation rate of the first driving roller based on the detected position of the formed image when a part of the formed image on the recording medium is nipped by the first roller pair, and a controller, which is configured to control the first driving roller to rotate in the rotation rate set by the rotation rate setting unit and convey the recording medium by the first roller pair.

BRIEF DESCRIPTION OF THE ACCOMPANYING DRAWINGS

FIGS. 6A-6C are diagrams to illustrate positions of the sheet S, an image formed on a first side of the sheet S, a driven roller 61, and a spur roller 63 in the MFP 1 according to the embodiment of the present invention.

FIGS. 7A-7B are diagrams to illustrate positions of the sheet S having been reversed with a second side facing upward, the image formed on the first side of the sheet S facing downward, the driven roller 61, and the spur roller 63, whilst the sheet S is nipped by a conveyer roller pair 60A, in the MFP 1 according to the embodiment of the present invention.

FIGS. 8A-8C are diagrams to illustrate positions of the sheet S having been reversed with the second side facing upward, the image formed on the first and second sides of the sheet S, the driven roller 61, and the spur roller 63, whilst the sheet S is nipped by the conveyer roller pair 60A and by a discharge roller pair 62A, in the MFP 1 according to the embodiment of the present invention.

FIGS. 9A-9B are diagrams to illustrate positions of the sheet S having been reversed with the second side facing upward, the images formed on the first and second sides of the reversed sheet S, the driven roller 61, and the spur roller 63, whilst the sheet S is nipped by the discharge roller pair 62A, in the MFP 1 according to the embodiment of the present invention.

FIGS. 10A-10B are diagrams to illustrate positions of the sheet S, images formed on an upper side of the sheet S, the driven roller 61, and the spur roller 63, whilst the sheet S is nipped by the discharge roller pair 62A, in the MFP 1 according to the embodiment of the present invention.

FIGS. 11A-11B are diagrams to illustrate positions of the sheet S, images formed on an upper side of the sheet S, the driven roller 61, and the spur roller 63, whilst the sheet S is nipped by the discharge roller pair 62A, in the MFP 1 according to the embodiment of the present invention.

DETAILED DESCRIPTION

Hereinafter, an embodiment of the present invention will be described with reference to the accompanying drawings. Firstly, an overall structure of a multifunction peripheral (MFP) 1 according to the present embodiment will be described with reference to FIG. 1.

Overall Configuration of the MFP 1

Figure 1:
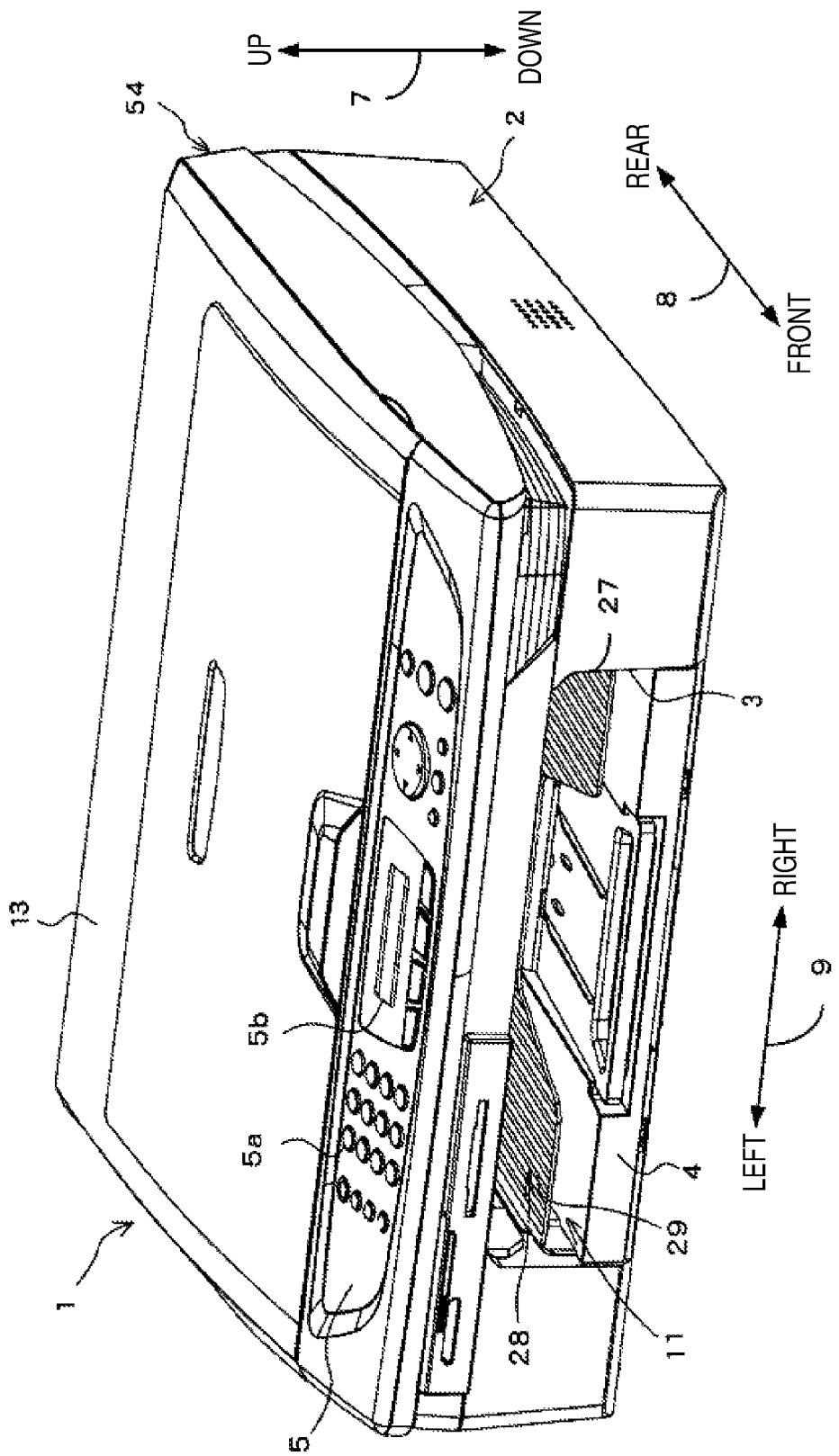
FIG. 1 is an external perspective view of a multifunction peripheral (MFP) 1 according to an embodiment of the present invention.

In the description below, directions concerning the MFP 1 will be referred to based on a user's position to ordinarily use the MFP 1. That is, a viewer's nearer side appearing in FIG. 1 is referred to as a front of the MFP 1, and a further side in FIG. 1 opposite from the front is referred to as rear. The front-rear direction is indicated by an arrow 8 in FIG. 1 and also referred to as a direction of depth. A side which corresponds to the viewer's left-hand side is referred to as left, and an opposite side from the left, which corresponds to the viewer's right-hand side, is referred to as right. The right-left direction is indicated by an arrow 9 in FIG. 1 and also referred to as a widthwise direction. The up-down direction in FIG. 1 corresponds to a vertical direction of the MFP 1 and indicated by an arrow 7 in FIG. 1.

The MFP 1 is a multifunction image-processing apparatus having a printer unit 2, a scanner unit 54, and an operation panel 5. According to the present embodiment, the printer unit 2 is an inkjet image-recording unit arranged in a lower section of the MFP 1 to print an image in inks being a recording agent. The scanner unit 54 is arranged in an upper section with respect to the printer unit 2, and the operation panel 5 is arranged in an upper-front section in the MFP 1. The MFP 1 is equipped with a plurality of functions, which include a printing function, a copier function, a scanning function, and facsimile transmission/receiving function. According to the present embodiment, the printer unit 2 in the MFP 1 is a double-face printer, which can form and record an image on either one of or both sides of a sheet S of recording paper.

The MFP 1 includes a sheet feeder 11, which feeds sheets S to the printer unit 2, in a lower section with respect to the printer unit 2. The sheet feeder 11 has a sheet-feed tray 4, in which unused sheets S are stacked. The sheet-feed tray 4 is detachably attached to the printer unit 2 and installed in the MFP 1 through an opening 3, which is formed on the front side of the printer unit 2. The sheet-feed tray 4 can accommodate the sheets S in a plurality of different sizes (e.g., letter, legal, postcard, etc.) therein. The sheets S can be set in the sheet-feed tray 4 with shorter (widthwise) edges thereof aligned in parallel with a main scanning direction. The main scanning direction is, according to the present embodiment, orthogonal to a sheet feeding direction being an auxiliary direction of the MFP 1.

The scanner unit 54 is an image reading device for the copier and facsimile transmission functions to read an image formed on a surface of an original document. The scanner unit 54 includes an original cover 56, which is placed on top of the scanner unit 54, to cover the original document when the original document is scanned. The original cover 56 is attached to be rotatable about a rear edge of the scanner unit 54. The operation panel 5 on the upper front section in the MFP 1 includes a plurality of operation buttons 5a and a liquid crystal display (LCD) 5b.

Secondly, an internal configuration of the MFP 1 will be described with reference to FIG. 2.

Printer Unit 2

The printer unit 2 has a separator plate 6, which separates one of the sheets S from the other sheets S. The separator plate 6 is arranged in a rear section with respect to the sheet-feed tray 4. The printer unit 2 further includes a feeder arm 10, which is supported by a frame (not shown) to be swingable about a front end thereof. The feeder arm 10 is provided with a feed roller 25, which is rotated by a feeder motor 71 (see FIG. 5), on a rear end thereof. The sheets S stacked in the sheet-feed tray 4 are separated one by one by the feed roller 25 and the separator plate 6 to be conveyed in a feeding path 14.

The feeding path 14 includes an upwardly curved section, which extends in between a curve-formed first upper guide 13a and a curve-formed first lower guide 13b. The one of the sheets S separated from the other is carried in the feeding path 14 and forwarded to a recording unit 24, which is arranged in an upper section with respect to the sheet-feed tray 4.

Recording Unit 24

The recording unit 24 in the MFP 1 will be described. The recording unit 24 includes a recording head 30 and a carriage 31. The recording head 30 is mounted on the carriage 31, which reciprocates in the widthwise direction 9. A lower surface of the recording head 30 is exposed to atmosphere through the carriage 31. The recording head 30 is supplied with colored inks, which include cyan (C), magenta (M), yellow (Y), and black (K) inks, from ink tanks (not shown) through ink tubes (not shown).

The recording head 30 is formed to have a plurality of nozzles 301 arranged in a grid on the lower surface thereof. The nozzles 301 align in a plurality of (e.g., 4) lines, each of which correspond to one of the four ink colors. The nozzle lines extend in parallel with the direction 8 of depth of the MFP 1. Therefore, four nozzles 301 including a nozzle 301 for each of the four colors align in lines in parallel with the widthwise direction 9, which corresponds to the reciprocating direction of the carriage 31.

The recording head 30 ejects ink drops from the nozzles 301 downwardly whilst the carriage reciprocates in the widthwise direction 9. Thus, the recording head 30 scans the sheet S being carried on a platen 34, and the ink drops ejected from the nozzles 301 are applied to the surface of the sheet S to form an image.

Figure 3:
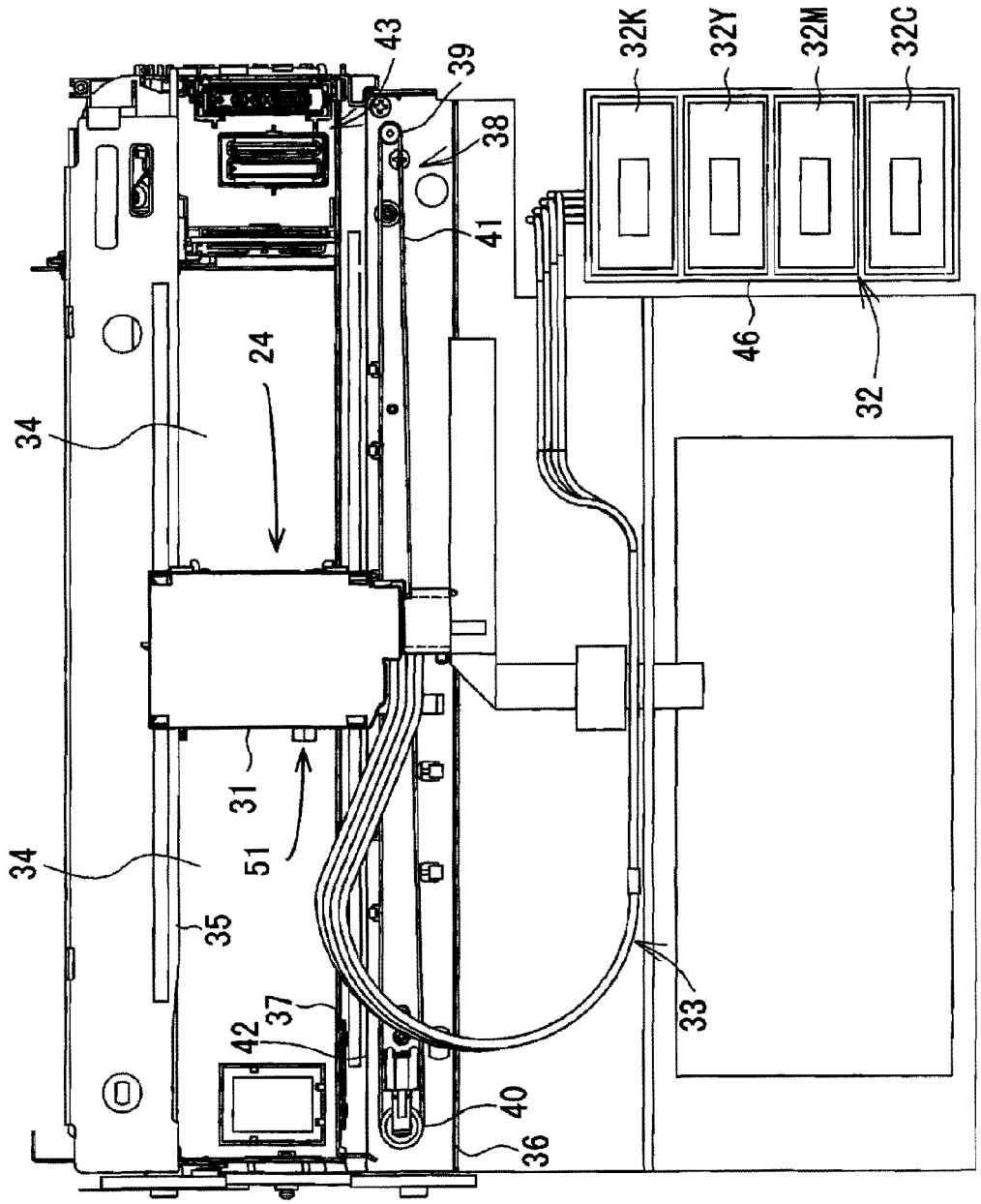
FIG. 3 is a top plane view of a recording unit 24 in a printer in the MFP 1 according to the embodiment of the present invention.

In the recording unit 24, a pair of guide rails 35, 35 are arranged in upper positions with respect to the platen 34 (see FIG. 3). The guide rails 35, 36 are arranged to extend along the widthwise direction 9 to be apart from each other in direction 8 of depth of the sheet S to have clearance in therebetween. The carriage 31 is slidably arranged to bridge over the guide rails 35 and 36.

On a side closer to the rear with respect to the guide rail 36, a belt driving system 38 is provided. The belt driving system 38 includes a driving pulley 39, a driven pulley 40, and a timing belt 41. The driving pulley 39 and the driven pulley 40 are arranged in vicinities of widthwise ends of a main scanning range of the carriage 31. The timing belt 41 is an endless belt having teeth on an inner surface thereof and extends along the widthwise direction to encircle the driving pulley 39 and the driven pulley 40. As an axis of the driving pulley 39 is coupled with a carriage motor 73 (see FIG. 5), the driving pulley 39 is rotated by driving force from the carriage motor 73. According to the rotation of the driving pulley 39, the timing belt 41 rolls around the driving pulley 39 and the driven pulley 40.

The timing belt 41 is fixed to the carriage 31 at a portion, and the carriage 31 reciprocates on the guide rails 35, 36 as the timing belt 41 rolls around the driving pulley 39 and the driven pulley 40. Thus, the recording head 30 reciprocates in the widthwise direction along with the carriage 31.

Figure 5:
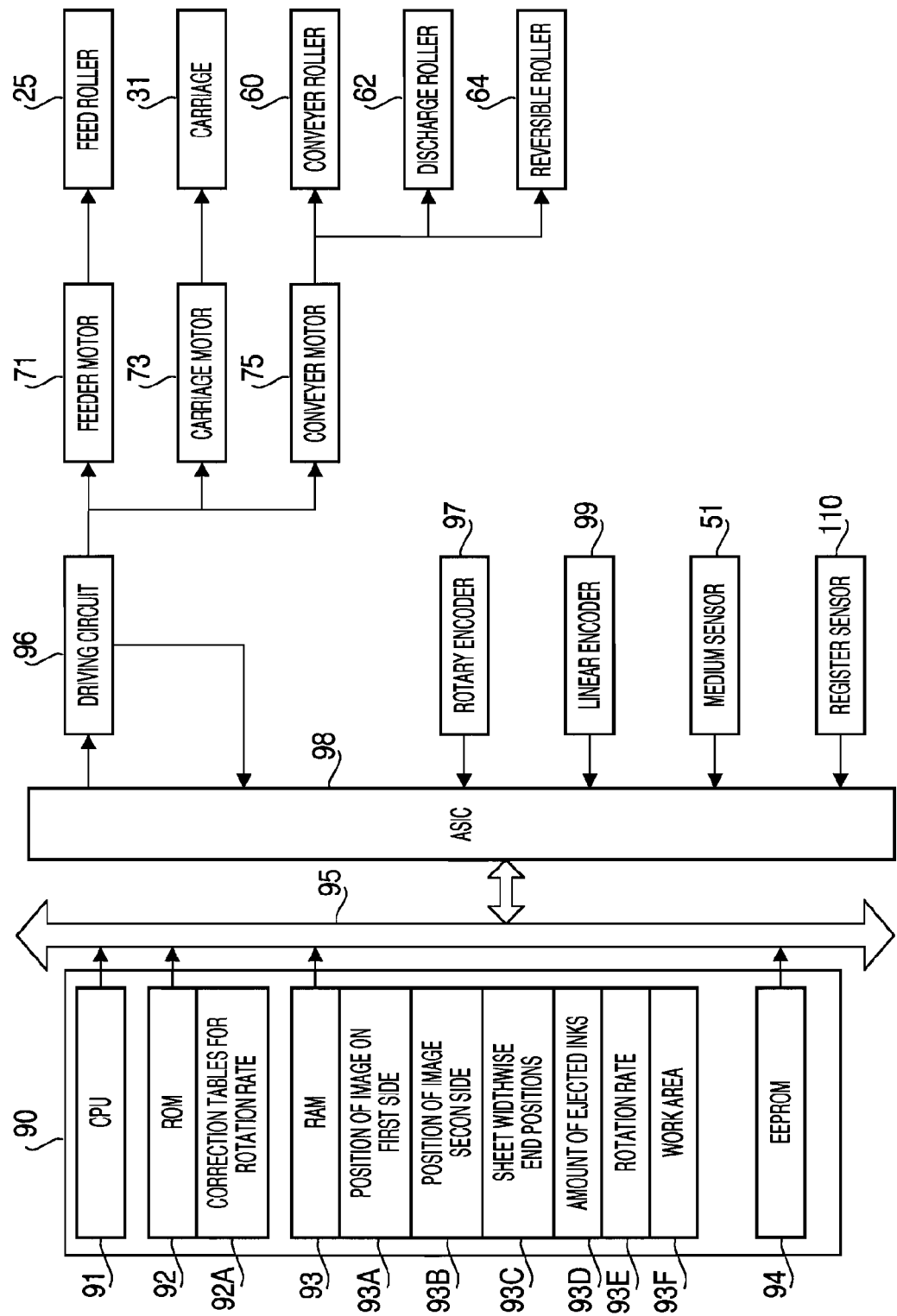
FIG. 5 is a block diagram to illustrate an electric configuration in the MFP 1 according to the embodiment of the present invention.

The guide rail 36 is provided with an encoder strip 42 for a linear encoder 99 (see FIG. 5). The linear encoder 99 detects the encoder strip 42 by a photo-interrupter (not shown) thereof and generate signals according to the detected result. Based on signals detected by the linear encoder 99, a position of the carriage 31 reciprocating in the main scanning direction can be detected; therefore movement of the carriage 31 can be controlled based on the detected position.

Further, in the recording unit 24, a platen 34 is provided in a lower position with respect to the recording head 30 (see FIG. 3). The platen 34 is arranged in a central area within the reciprocating range of the carriage 31, in which the sheet S is carried. The platen 34 is formed to have a width (i.e., a length in the right-left direction) thereof to be larger than a maximum allowable width of the sheet S; therefore, widthwise ends of the sheet S being carried are within the widthwise range of the platen 34 at all times.

It is to be noted that the recording unit 24 is not necessarily an inkjet printing unit but may be, for example, an electrophotographic printer or a thermal printer.

Conveyer Unit 52

A conveyer unit 52 in the MFP 1 will be described below. In the conveyer unit 52, a conveyer roller pair 60A, which includes a conveyer roller 60 and a driven roller 61, is provided in an upstream position along the feeding path 14 with respect to the platen 34. The conveyer roller 60 is connected with a conveyer motor 75 (see FIG. 3) being a drive source and receives driving force transmitted thereto. The driven roller 61 is arranged in a lower position with respect to the conveyer roller 60 across the feeding path 14 and urged against a circumference of the conveyer roller 60 by a resilient member (not shown) such as a spring. In the present embodiment, the driven roller 61 includes eight (8) rollers a, b, c, d, e, f, g, h, which are arranged in line along the widthwise direction 9. The conveyer roller 60 and the driven roller 61 nip an unprinted sheet S being conveyed in the feeding path 14 and forward to a position over the platen 34 as the conveyer roller 60 rotates.

In the conveyer unit 52, further, a discharge roller pair 62A, which includes a discharge roller 62 and a spur roller 63, is provided in a downstream position along the feeding path 14 with respect to the platen 34. The discharge roller 62 is connected with the conveyer motor 75 and receives driving force transmitted thereto. The spur roller 63 is arranged in an upper position with respect to the discharge roller 62 across the feeding path 14 and urged against a circumference of the discharge roller 62 by a resilient member (not shown) such as a spring. In the present embodiment, the spur roller 63 includes eight (8) spurs A, B, C, D, E, F, G, H in line along the widthwise direction 9 (see FIG. 6). Thus, the discharge roller 62 and the spur roller 63 nip the printed sheet S being conveyed over the platen 34 and forward to a further downstream position in the feeding path 14. According to the present embodiment, the conveyer roller pair 60A is designed to nip the sheet S in greater nipping force than nipping force of the discharge roller pair 62A.

The conveyer roller 60 and the discharge roller 62 are rotated by the driving force from the conveyer motor 75 (see FIG. 3) and transmitted via a known transmission system (not shown). The transmission system includes a plurality of gears such as planet gears, which rotate the conveyer roller 60 and the discharge roller 62 in one predetermined direction regardless of rotating directions of the conveyer motor 75 (either normal or reverse rotation) in order to convey the sheet S in a predetermined direction (i.e., rightward in FIG. 2). According to the present embodiment, the conveyer roller 60 and the discharge roller 62 are driven intermittently during an image recording operation to carry the sheet S intermittently by a predetermined linefeed amount Y (see FIG. 6) during the image recording operation.

The sheet S with the printed image is carried to a discharge section 28 with the printed side facing upward. The discharge section 28 is arranged in an upper position with respect to the sheet feeder 11. The discharge section 28 is exposed to atmosphere through an outlet 27, which partly coincides with the opening 3 (see FIG. 1) formed on the front side of the printer 2. Thus, the sheet S ejected out of the discharge section 28 is settled in a discharge tray 29, which is arranged inside the opening 3.

Path Switch 70

In a position between the discharge roller pair 62A and the discharge section 28, a path switch 70 is provided. The path switch 70 includes a reversible roller 64 to be driven by the conveyer roller 75 (see FIG. 3) and a driven roller 65 urged against the reversible roller 64. Further, the path switch 70 includes an upper guide 48 and a lower guide 46. The upper guide 48 and the lower guide 46 are arranged to face each other and are in inclined orientations toward the sheet-feed tray 4 from the position between the discharge roller pair 62A and the discharge section 28. The upper guide 48 and the lower guide 46 are arranged to maintain clearance therebetween to form a reverse path 44.

The driven roller 65 is rotatably supported by a switch 72, which is swingably attached to a frame (not shown). The switch 72 is arranged to extend toward the spur roller 63 and is provided with a rotatable auxiliary roller 66.

In the present embodiment, the conveyer unit 52 includes the conveyer roller 60, the driven roller 61, the discharge roller 62, the spur roller 63, the conveyer motor 75, and the path switch 70. In the conveyer unit 52, the discharge roller 62 and the spur roller 63 convey the sheet S toward the discharge section 28, and as the reversible roller 64 and the driven roller 65 nipping the conveyed sheet S rotate in a normal direction, the sheet S is discharged to be settled in the discharge tray 29.

Figure 2:
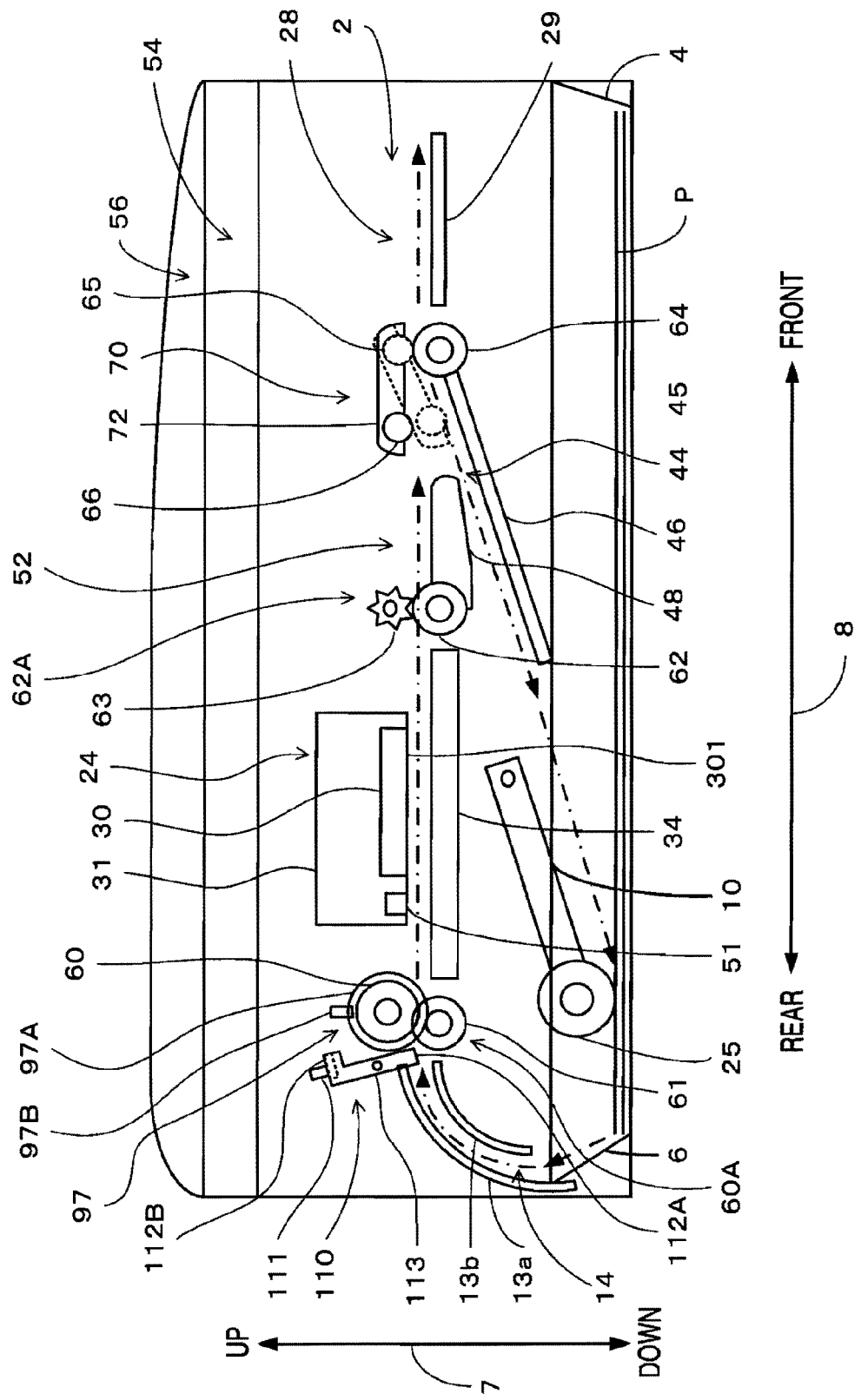
FIG. 2 is a cross-sectional side view of the MFP 1 according to the embodiment of the present invention taken along a direction of depth (front-rear direction) shown in FIG. 1.

With the sheet S being nipped by the reversible roller 64 and the driven roller 65, and with a rear end portion of the sheet S being in contact with the auxiliary roller 66, the normal rotation of the reversible roller 64 may be stopped, and the switch 72 may be rotated to have a rear end thereof to a lower position, as indicated by a dotted line in FIG. 2. In this regard, the rear end portion of the sheet S is pressed downward in the reverse path 44, and when the reversible roller 64 is rotated in the reverse direction, the sheet S is carried in the reverse path 44 toward a position above the sheets S in the sheet-feed tray 4. Further, the reversed sheet S is carried in the feeding path 14 by the feed roller 25. In this reverse-carrying operation, the sheet S is reversed to have the image-formed side facing downward, and an unprinted side facing upward. Thus, images can be printed on both sides of the sheet S.

Register Sensor 110

A register sensor 110 is arranged in an upstream position along the feeding path 14 with respect to the conveyer roller pair 60A. The register sensor 110 includes, for example, a rotary member and an optical sensor 111. According to the present embodiment, the rotary member has a first detectable section 112A and a second detectable section 112B. Further, the optical sensor 111 may be a photo interrupter having a light-emitting element (e.g., an LED) and a light-receiving element (e.g., a phototransistor) to receive the emitted light. The rotary member is rotatable about an axis 113 and is in an orientation to have the first detectable section 112 hanging downward from the axis 113. Therefore, when no external force is applied to the rotary member, the second detectable section 112B is in a light path for the light emitted from the light-emitting element toward the light-receiving element of the optical sensor 111 to interrupt the light.

With the rotary member with the first detectable section 112A hanging downward, when the sheet S is carried in the feeding path 14 to become in contact with the first detectable section 112A at a front edge thereof, the rotary member rotates about the axis 113 counterclockwise in FIG. 2. Accordingly, the second detectable section 112B is rotated counterclockwise and moves out of the light path of the light from the light-emitting element. Therefore, the light is allowed to reach the light-receiving element to be received. When the light is received in the light-receiving element, a level of signals output from the light-receiving element of the optical sensor 111 changes from low to high. Based on the signal level change, a controller unit 90 (see FIG. 5) detects presence of the sheet S.

In the present embodiment described below, the controller unit 90 recognizes that the register sensor 110 is switched on when the signal level of the optical sensor is changed from low to high and that the register sensor 110 is switched off when the signal level is changed from high to low.

Rotary Encoder 97

A rotary encoder 97 (see FIG. 2) will be described hereinbelow. The rotary encoder 97 includes an encoder disk 97A and a photo-interrupter 97B. The encoder disk 97A is fixed to one of axial ends of the conveyer roller 60 and has a plurality of radially-formed slits (not shown) on a surface thereof. As the encoder disk 97A rotates along with rotation of the conveyer roller 60, the photo-interrupter 97B detects the slits on the surface and generates signals based on the detected slits. Thus, a rotation rate of the conveyer roller 60 is detected, and a position of the sheet S being carried in the feeding path 14 can be detected based on the rotation rate. Therefore, movements of the conveyer roller 60 and the discharge roller 62 can be controlled based on the signals generated in the photo-interrupter 97B.

According to the present embodiment, detecting a position of a front end of the sheet S being conveyed is initiated when the register sensor 110 is switched on by the front end of the sheet S. The front end of the sheet S refers to an edge of the sheet S entering in the feeding path 14 earlier than the remaining of the sheet S being closer to the most downstream section in the MFP 1. After the initiation, the rotation rates of the conveyer roller 60 and the discharge roller 62 are calculated by the rotary encoder 97, and based on the calculation, the position of the front end of the sheet S can be determined.

Meanwhile, detecting a position of a rear end of the sheet S being carried in the feeding path 14 is initiated when the rear end exits a detectable range of the register sensor 110 and the register sensor 110 is switched off. After the initiation, the rotation rate of the conveyer roller 60 and the discharge roller 62 is calculated by the rotary encoder 97, and based on the calculation, the position of the rear end of the sheet S can be determined.

Medium Sensor 51

Figure 4:
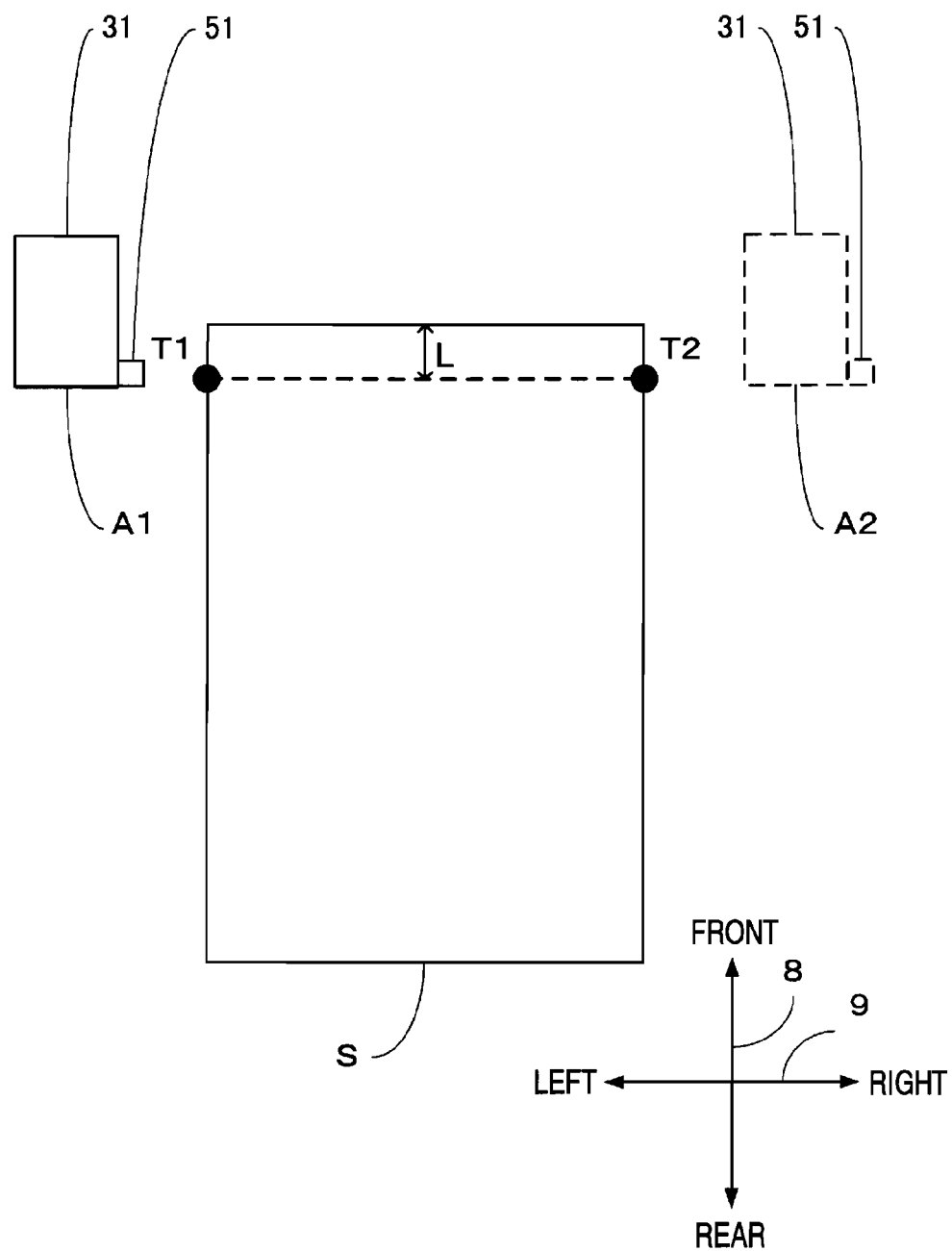
FIG. 4 is a diagram to illustrate positions of widthwise ends of a recording sheet S and a medium sensor 51 in the MFP 1 according to the embodiment of the present invention.

A medium sensor 51 (see FIG. 2) is described hereinbelow. The medium sensor 51 is arranged in a rear position in the carriage 31 and includes a light-emitting element (e.g., an LED) and a light-receiving element (e.g., a phototransistor). A method to detect positions of widthwise ends of the sheet S on the platen 34 by the medium sensor 51 will be described with reference to FIG. 4. It may be noted, in FIG. 4, that the platen 34 and the conveyer roller pair 60A are omitted in order to simplify the illustration.

Firstly, the sheet S is carried in the feeding path 14 by the conveyer roller pair 60A frontward. In this regard, an index position, which is set in a position apart from the front end of the sheet S for a predetermined distance L, is brought in a reading position below the medium sensor 51 in the carriage 31 in order to secure a predetermined amount of clearance between the index position and the front end of the sheet S. The conveyer roller 60 is stopped when the index position comes to the reading position. The medium sensor 51 in the carriage 31 receives the light reflected on the upper surface of the platen 34 and the upper surface of the sheet S as the carriage 31 reciprocates along the widthwise direction. In this regard, for example, when the upper surface of the platen 34 is painted in a color (e.g., black) of different reflectivity from that of the sheet S, the reflection value detected on the platen 34 and the reflection value detected on the sheet S can be distinguished. When the medium sensor 51 moves along with the carriage 31 rightward to cross a left end T1 of the sheet S, the reflection values indicating detection of the platen 34 change to the reflection values indicating detection of the sheet S. On the other hand, when the medium sensor 51 moves from leftward to cross a right end T2 of the sheet S, the reflection values indicating detection of the sheet S change to the reflection values indicating detection of the platen 34. Thus, the widthwise ends of the sheet S are detected based on the changes in the reflection values obtained from the medium sensor 51.

Meanwhile, positions of the carriage 31 are determined by values obtained from the linear encoder 99. Therefore, when positions of the changes in the reflection values detected by the medium sensor 51 are associated with the values indicating the positions of carriage 31 obtained from the linear encoder 99, the positions of the widthwise ends of the sheet S along the right-left direction 9 are determined. The determined positions of the widthwise ends of the sheet S are stored temporarily in a memory area 93C for the widthwise ends (see FIG. 5).

Electric Configuration

Electric configuration of the MFP 1 will be described hereinbelow with reference to FIG. 5. The controller unit 90 controls behaviors of the entire MFP 1. In the following description, however, description of controlling behaviors in association with the scanner unit 54 and the recording unit 24 are omitted.

The controller unit 90 is a microcomputer including a CPU 91 for arithmetic processing, a ROM 92 to store controlling programs, a RAM 93 serving as a storage for data and a work area for the arithmetic operations, and an EEPROM 94 to store information concerning configuration of the MFP 1. These components are connected with an ASIC 98 through a bus 95 for data exchange.

The CPU 91 controls the functions and behaviors in the components in the MFP 1 according to predetermined data and programs stored in the ROM 92 and RAM 93. In the present embodiment, the CPU 91 determines a position of an image formed by the recording unit 24 on the sheet S and controls rotation rates of the conveyer roller 60 and the discharge roller 62 based on the determined position of the image.

The ROM 92 stores various programs to control behaviors of the components in the MFP 1. For example, programs to perform operations illustrated in FIGS. 12-16 and data to be used in the programs are stored in the ROM 92. Further, the ROM 92 includes a memory area 92A to store correction tables for rotation rate.

The memory area 92A stores correction tables (Table 1, see below), which are prepared to correct a rotation rates of the conveyer roller 60 and the discharge roller 62 according to an image having been formed on the sheet S. T1 in Table 1 shown below indicates and a rate of the conveyer roller pair 60A and/or the discharge roller pair 62A to be rotated. According to the present embodiment, the rotation rate differs depending on the roller pair(s) to be used to carry the sheet S. This is due to the difference in nipping forces to nip the sheet S between the conveyer roller pair 60A and the discharge roller pair 62A. That is, the nipping force(s) to be applied to the sheet S differs depending on the roller pair(s) to carry the sheet S, namely, as to whether the sheet S is carried by both or one of the conveyer roller pair 60A and the discharge roller pair 62A. In this regard, an amount of the sheet S to be conveyed differs due to the difference in the nipping forces. Therefore, in order to maintain a correct conveying rate, the rotation rate is differentiated depending on the roller pair(s) to be used to carry the sheet S.

T2, T3, and T4 in Table 1 shown below indicate first correction parameters A (N), B1 (n), and B2 (N), which are selected, in order to obtain corrected rotation rate(s) of the conveyer roller pair 60A and/or the discharge roller pair 62A, depending on the driven rollers (i.e., the driven roller 61 and/or the spur roller 63) to be used to nip the sheet S in cooperation with the conveyer roller 60 and the discharge roller 62. The sign N in T2, T4 represents to the spurs A-H in the spur roller 63, and the sign n in T 3 represents to the rollers a-h in the driven roller 61. The correction parameters A, B1, B2 are set in consideration of variation of the nipping forces in the conveyer roller pair 60A and the discharge roller pair 62A, which may vary when, for example, a quantity and a type of the driven rollers to cope with the conveyer roller 60 and/or the discharge roller 62 change, or when a position of the sheet S in the widthwise direction 9 changes. When the nipping forces in the conveyer roller pair 60A and the discharge roller pair 62A change, the amounts of the sheet S to be conveyed per unit of time may be different between the conveyer roller pair 60A and the discharge roller pair 62A; therefore, the rotation rates of the conveyer roller 60 and/or the discharge roller 62 are corrected depending on the rollers a-h in the driven roller 61 and the spurs A-H in the spur roller 63 to be used to nip and convey the sheet S so that a correct amount of sheet S can be conveyed in a correct rate. In the present embodiment, the first correction parameters A, B1, B2 are indicated in percentages, which range from 100.0% to 100.1%.

T5 in Table 1 indicates second correction parameters P, by which the rotation rates of the conveyer roller pair 60A and the discharge roller pair 62A are adjusted based on amounts of the inks being ejected in a linefeed Y on the sheet S during an image-forming operation. The condition of the sheet S having the image being formed on the surface thereof changes as the inks are ejected, and the nipping forces of the conveyer roller pair 60A and the discharge roller pair 62A may vary depending on the amounts of the inks being ejected. Therefore, in order to maintain a correct conveying amount, the rotation rate is adjusted depending on the amounts of the inks used to form the image. T6 will be mentioned later.

In the present embodiment, the second correction parameters P are prepared for P being equal to 0 (P=0) (unit: cc), P being greater than 0 and smaller than or equal to k1 (cc) ($0<P\leq k1$), P being greater than k1 and smaller than or equal to k2 (cc) ($k1<P\leq k2$), and P being greater than k2 (cc) (P>k2). Meanwhile, the second correction parameters P range from 100.0% to 100.1%. In the description hereinbelow, ink amounts ejected in the ranges $0<P\leq k1$, $k1<P\leq k2$, and P>k2 will be referred to as K1, K2, and K3 respectively in order to simplify the explanation.

TABLE 1

(T1)

| Roller pair to nip to the sheet | Conveyer roller pair | Conveyer roller pair and discharge roller pair | Discharge roller pair |
|---|---|---|---|
| Rotation rate (mm) | F0 | F1 | F2 |

(T2)

| Spur straight above to overlap the image formed on an upper surface | A | B | C | D | E | F | G | H |
|---|---|---|---|---|---|---|---|---|
| Correction parameter A (N) (%) | A(A) | A(B) | A(C) | A(D) | A(E) | A(F) | A(G) | A(H) |

(T3)

| Roller straight below to overlap the image formed on a lower surface | a | b | c | d | e | f | g | h |
|---|---|---|---|---|---|---|---|---|
| Correction parameter B1 (n) (%) | B1(a) | B1(b) | B1(c) | B1(d) | B1(e) | B1(f) | B1(g) | B1(h) |

(T4)

| Spur straight above to overlap the image formed on the lower surface | A | B | C | D | E | F | G | H |
|---|---|---|---|---|---|---|---|---|
| Correction parameter B2 (N) (%) | B2(A) | B2(B) | B2(C) | B2(D) | B2(E) | B2(F) | B2(G) | B2(H) |

(T5)

| Amount of ejected inks (unit: cc) | 0 | K1 (0-k1) | K2 (k1-k2) | K3 (k2+) |
|---|---|---|---|---|
| Correction parameter Px (%) | B2(A) | B2(B) | B2(C) | B2(D) |

(T6)

| Amount of ejected inks (unit: cc) | K1 (0-k1) | K2 (k1-k2) | K3 (k2+) |
|---|---|---|---|
| Correction parameter Px (%) | B2(B) | B2(C) | B2(D) |

The RAM 93 (FIG. 5) in the controller unit 90 is used as a work area, in which the programs to be run by the CPU 91 are loaded, and a memory area, in which data to be used in the programs are stored. The RAM 93 includes a memory area 93A for a position of image on first side, a memory area 93B for a position of image on second side, the memory area 93C for sheet widthwise end positions, a memory area 93D for amount of ejected inks, a memory area 93E for rotation rate, and a work area 93F.

In the memory area 93A for a position of the image on first side, positional information of an image to be formed on a first side of the sheet S during an image-forming operation is stored. In this regard, the first side may be one of two sides of the sheet S, solely on which the image is to be formed during a single-side printing operation, and one of two sides of the sheet S, on which the image is to be formed firstly prior to the other side during a double-face printing operation. The memory area 93B for a position of the image on second side is an area to store positional information of an image to be formed on a second side, which is the other side of the sheet S than the first side during the double-face printing operation. The positions of the images are calculated based on the values detected by the linear encoder 99, which can determine the timings of ink ejection by the reciprocating recording head 30, and the values detected by the rotary encoder 97, which can determine the position of the sheet S.

The memory area 93C for sheet widthwise end positions stores the positional information of the widthwise ends of the sheet S in the widthwise direction 9, which is detected by the medium sensor 51.

The memory area 93D for amount of ejected inks store information concerning the amounts of the inks ejected onto the sheet S to form the image. The memory area 93E for rotation rate stores rates of rotation of the conveyer roller 60 and the discharge roller 62 set in rotation rate setting flows, which will be described later in detail. Namely, the CPU 91 controls the conveyer roller 60 and the discharge roller 62 to rotate based on the rotation rates stored in the memory area 93E. The work area 93F is an area to temporarily store data other than the information to be stored in the memory areas 93A-93E.

In the EEPROM 94, information to be maintained even after power shut-down of the MFP 1, such as setting information and flags, is stored.

The ASIC 98 is connected with a driving circuit 96. The driving circuit 96 drives the feeder motor 71, which is connected to the feed roller 25, the carriage motor 73, which is connected to the carriage 31, and the conveyer motor 75, which is connected to the conveyer roller 60, the discharge roller 62, and the reverse roller 64.

The driving circuit 96 is provided with driver software to drive the feeder motor 71, the carriage motor 73, and the conveyer motor 75. The feeder motor 71, the carriage motor 73, and the conveyer motor 75 are controlled by the driver software separately from one another. Rotations from the feeder motor 71 and the carriage motor 73 are transmitted to the feed roller 25 and the carriage 31 respectively by known transmissions. Meanwhile, rotation from the conveyer motor 75 is transmitted to the conveyer roller 60, the discharge roller 62, and the reverse roller 64.

In the present embodiment, the conveyer motor 75 provides a drive source to be transmitted to and received in the conveyer roller 60 and the discharge roller 62, which convey the sheet S toward the platen 34 and the sheet S on the platen 34, with or without a formed image, toward the discharge section 28. The conveyer motor 75 also provides a drive source to the reverse roller 64, which conveys the sheet S toward the reverse path 44.

Whilst the ASIC 98 is connected with the controller unit 90 via the bus 95, the ASIC 98 is also connected with the drive circuit 96, the medium sensor 51, the rotary encoder 97, the linear encoder 99, and the register sensor 110.

Behaviors of the MFP 1

Thirdly, behaviors of the MFP 1 will be described with reference to FIGS. 6-16 and Table 1.

Main Flow

Figure 12:
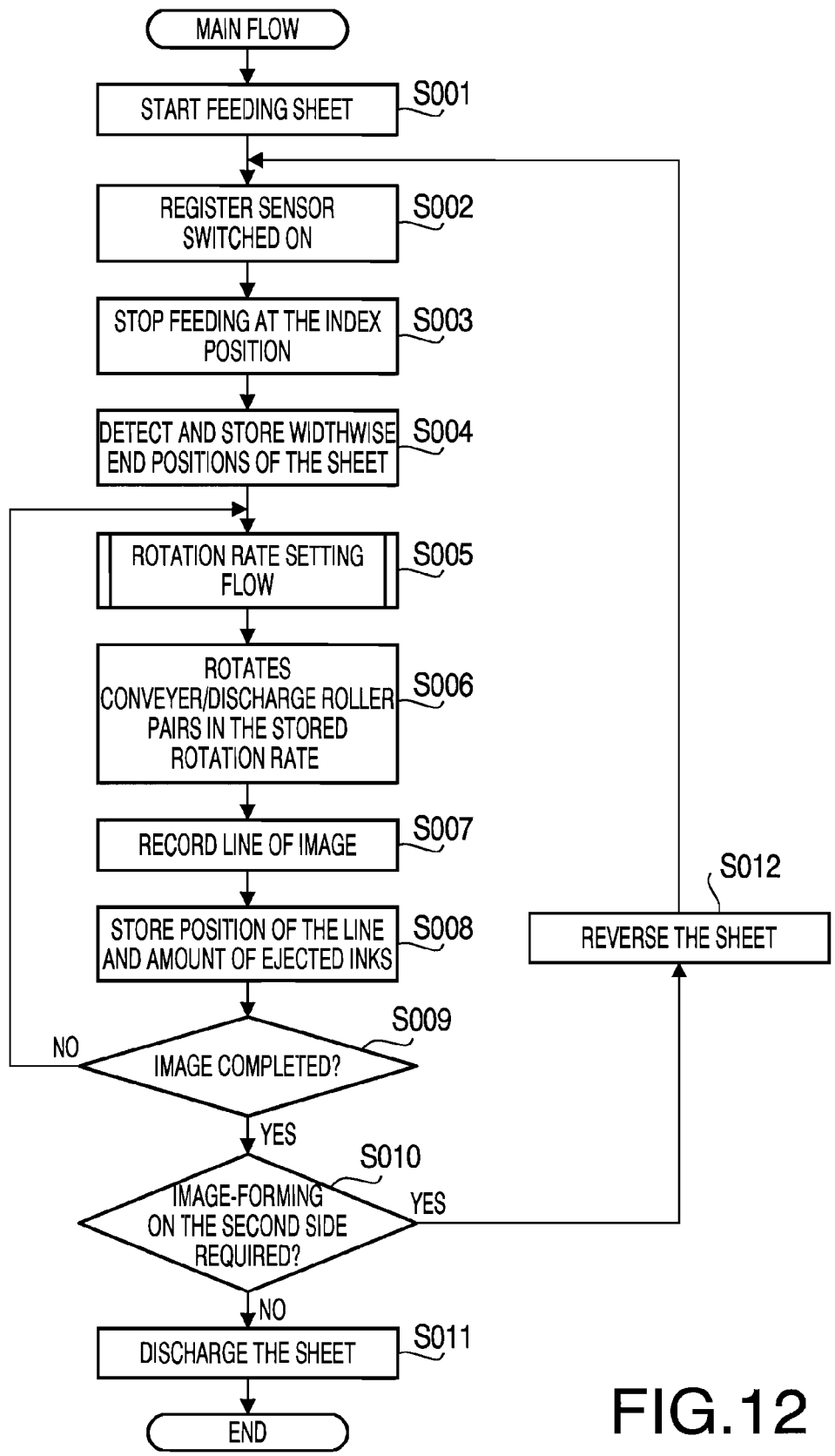
FIG. 12 is a flowchart to illustrate a main flow to be executed by in a controller unit 90 in the MFP 1 according to the embodiment of the present invention.

The main flow of the image-forming operation in the MFP 1 will be described with reference to FIG. 12. The main flow is activated when a user selects to use one of image-recording functions of the MFP 1, including printing function, the scanner function, and the copier function, and enters the selection through the operation panel 5. In the main flow, the correction parameters to correct the rotation rate(s) of the conveyer roller 60 and/or the discharge roller 62 is determined based on a position of the image formed on the sheet S and based on a quantity and types of the rollers a-h straight below the image and/or the spurs A-H straight above the image when the image (if any) formed on the sheet S is in a vertically overlapping position straight above the rollers a-h of the conveyer roller pair 60A or when the image (if any) is in a vertically overlapping position straight below the spurs A-H of the discharge roller pair 62A. Further, in the main flow, the rotation rate(s) of the conveyer roller 60 and/or the discharge roller 62 is adjusted based on the determined correction parameters, and the sheet S is conveyed by the correctly rotated conveyer roller 60 and/or the discharge roller 62. Concerning the present embodiment, an image being in the "overlapping" position with respect to the spur roller 63 or the driven roller 61 refers to a condition, in which at least a part of a circumferential surface of a spur A-H in the spur roller 63 is in contact with an upper surface of the sheet S being conveyed to nip the sheet S, or at least a part of a circumferential surface of a roller a-h in the driven roller 61 is in contact with a lower surface of the sheet S being conveyed to nip the sheet S. In this regard, the image (inks forming the image) may not necessarily be in direct contact with the spur A-H or the roller a-h. For example, when the image formed on a lower side of the sheet S falls on a position to vertically overlap one of the spurs A-H as the sheet S is conveyed, the image may be in contact with the spur indirectly through the sheet S and may not be in direct contact with the spur. In the present embodiment, still the image is in the "overlapping position" whilst the image vertically overlaps the spur and the spur is in contact with a portion of the sheet S having the image. When the image formed on the sheet S is in the overlapping position to overlap the spur roller 63 or the driven roller 61, the image is nipped by the spur roller 63 or the driven roller 61 together with the sheet S.

The main flow starts upon entry of the instruction by the user to start the printing operation. In S001, the CPU 91 controls the feed roller 25 to rotate to feed the sheet S from the sheet-feed tray 4 in the feeding path 14. Next, in S002, the CPU 91 ascertains that the register sensor 110 is switched on, and in S003, the CPU 91 determines that the sheet S is conveyed to have the predetermined index position in the reading position below the medium sensor 51 in the carriage 31. The CPU 91 stops feeding the sheet S thereat. In S004, the positions of the widthwise ends of the sheet S along the widthwise direction 9 are detected by the medium sensor 51, and the CPU 91 stores the detected positions of the widthwise ends in the memory area 93C for sheet widthwise end positions.

Next, in S005, a flow to set the rotation rate(s) of the conveyer roller 60 and/or the discharge roller 92 is activated. The rotation rate setting flow will be described later in detail. Following S005, in S006, the CPU 91 controls the conveyer roller 60 and/or the discharge roller 62 to rotate in the rotation rate determined and stored in the memory area 93E for rotation rate in the rotation rate setting flow in S005. In this regard, the sheet S is forwarded for a linefeed amount Y (unit: inch). In S007, the image is formed on the sheet S by the recording head 30, which ejects the inks onto the sheet S whilst the carriage 31 in the recording unit 24 reciprocate in the widthwise direction 9.

In S008, the CPU 91 stores information concerning a position of the line Y of image formed in S007 in the memory area 93A for the position of the image formed on the first side and information concerning an amount of the inks ejected to form the line Y in S007 in the memory area 93D for amount of ejected inks. In S008, when the line Y of image is formed on the second side of the sheet S during a double-face printing, the CPU 91 stores the information concerning the position of the formed line Y of image in the memory area 93B for the position of the image on the second side.

In S009, the CPU 91 determines as to whether the instructed image, which may include one or more lines Y, has been completed. When the image-forming has been completed (S009: YES), the flow proceeds to S010, in which the CPU 91 determines as to whether forming an image on the second side of the sheet S is required. In S009, if the image-forming has not been completed (S009: NO), the flow returns to S005 and repeats S005-S009. Thus, the CPU 91 continues to control the recording unit 24 to form another line Y of image to complete the instructed image. Hereinafter, the flow S006-S009 will be referred to as an image recording flow. In S010, when the CPU 91 determines that forming an image on the second side of the sheet S is not required (S010: NO), in S011, the CPU 91 discharges the sheet S with the completed image. The flow ends thereafter. In S010, when the CPU 91 determines that forming an image on the second side of the sheet S is required (S010: YES), in S012, the CPU reverses the sheet S to have the first side of the sheet S facing downward and returns to S002 to repeat S002-S010 to form the complete image on the second side. When the sheet S is reversed, therefore, the first side with the formed image becomes the lower side of the sheet S.

Rotation Rate Setting Flow

Next, the flow to set the rotation rates (see S005 in FIG. 12) will be described with reference to FIGS. 6-11, 12-16 and Table 1.

Rotation Rate Setting Flow for the First Side

Figure 13:
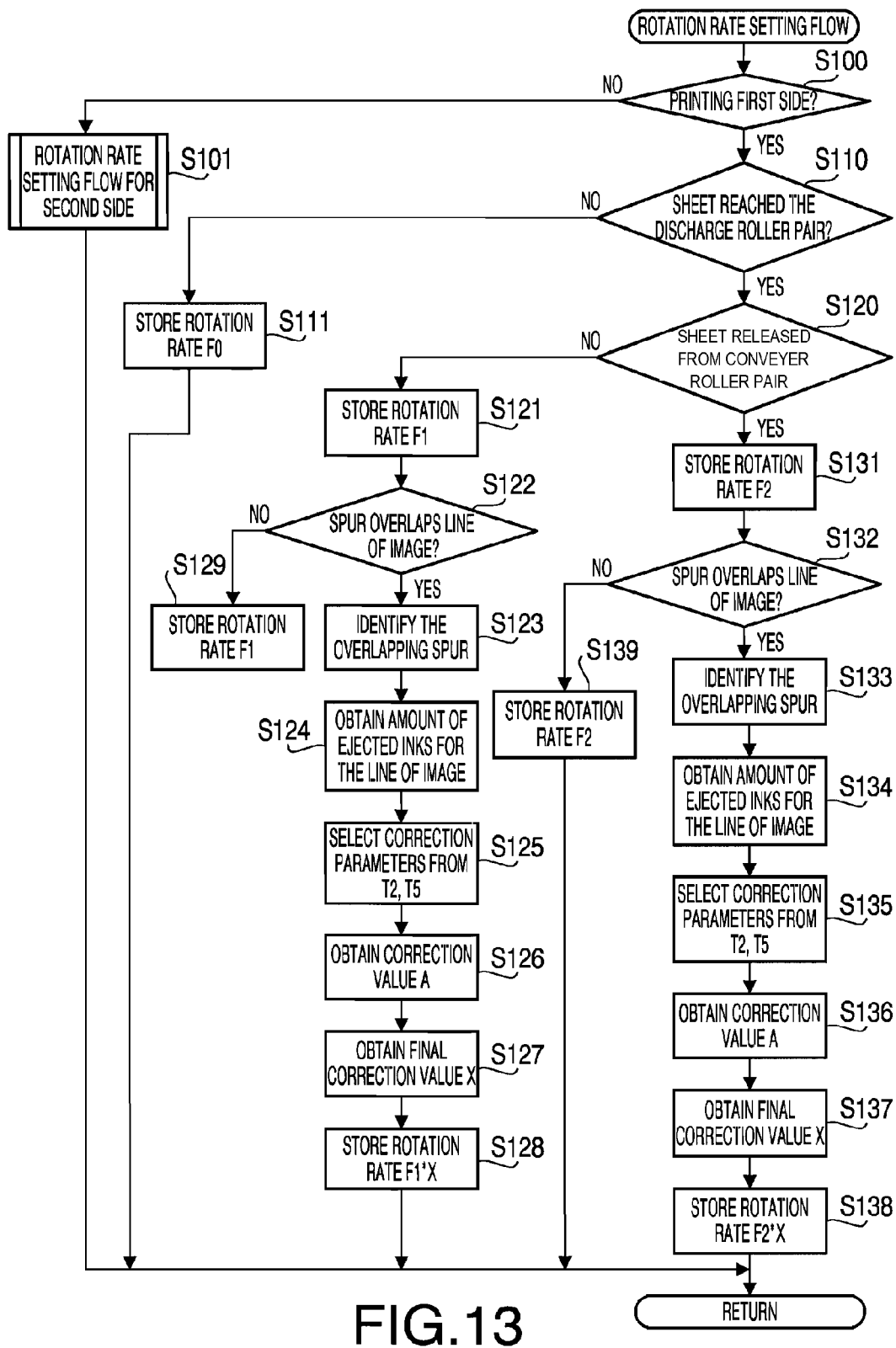
FIG. 13 is a flowchart to illustrate a rotation rate setting flow to be executed by the controller unit 90 in the MFP 1 according to the embodiment of the present invention.
Figure 14:
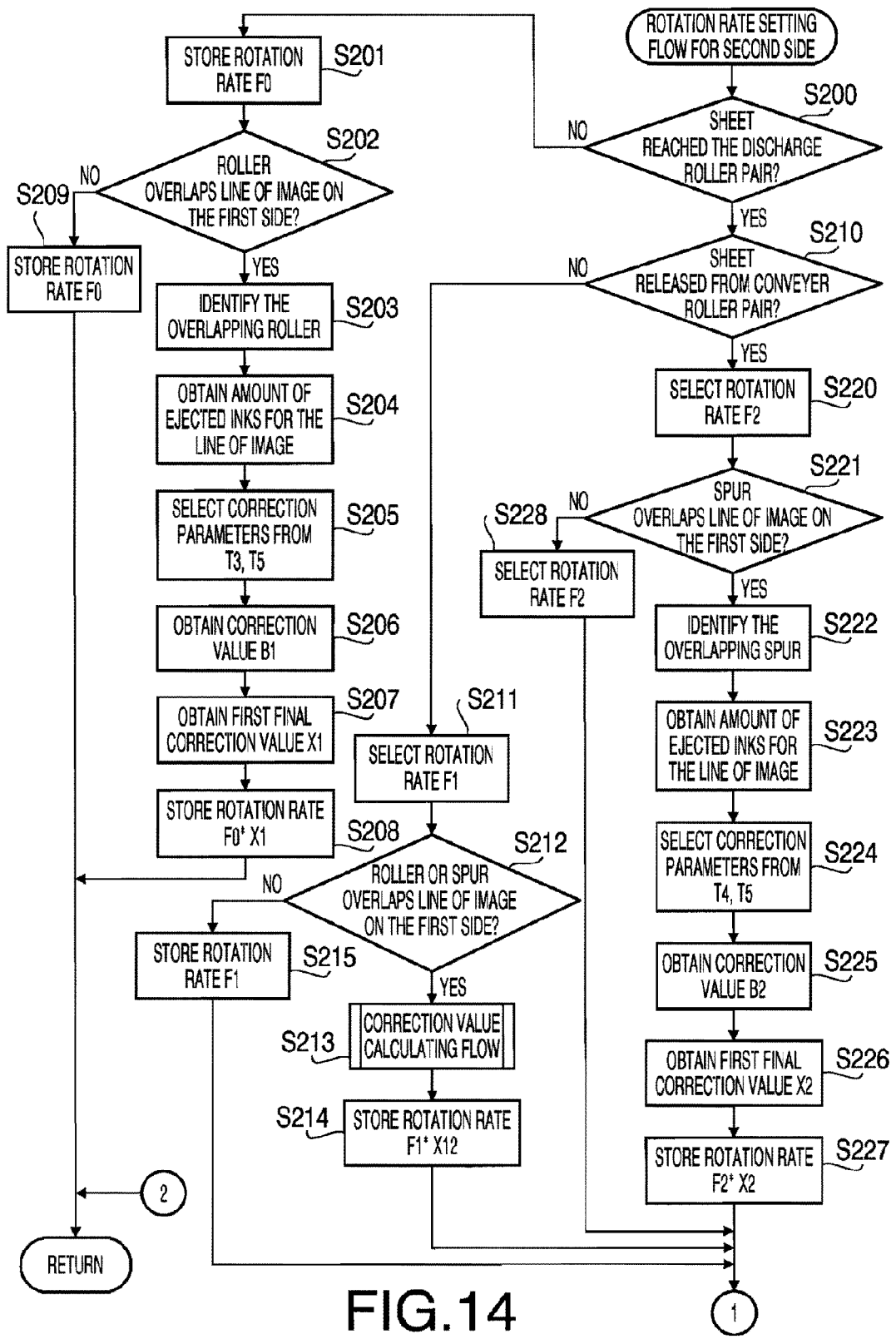
FIG. 14 is a flowchart to illustrate a second rotation rate setting flow to be executed by the controller unit 90 in the MFP 1 according to the embodiment of the present invention.

The rotation rate setting flow for the first side of the sheet S, which is activated in S005 in the main flow (FIG. 12), will be described with reference to FIGS. 6 and 13. The rotation rate setting flow for the first side of the sheet S includes a flow of steps, which follows an affirmative judgment in S100 (S100: YES) in FIG. 13.

FIG. 6A illustrates a position of the sheet S, which has not yet reached the discharge roller pair 62A. FIG. 6B illustrates positions of the spurs A-H in the spur roller 63 and of an outline of the image formed on the first side (the upper surface) of the sheet S, which is forwarded from the position shown in FIG. 6A. FIG. 6C illustrates positions of the rollers a-h, the spurs A-H, and the image formed on the first side of the sheet S, which is further forwarded from the position shown in FIG. 6B for the linefeed amount Y in the direction 8 of depth and released from the nipping force of the conveyer roller pair 60A. In FIGS. 6B-6C and further in 7B, a shaded area 400 with hatched lines inclining to be lower at the right-hand side illustrates a part of the image formed in a single linefeed Y on the upper surface of the sheet S and indicates an area, on which at least part of the spur roller 63 overlaps. Clearance between two dash-and-dot lines indicates an amount of the linefeed amount Y.

In the rotation rate setting flow for the first side, rotation rates for the conveyer roller 60 and/or the discharge roller 62 are selectively determined depending on whether the sheet S is nipped substantially by the conveyer roller pair 60A alone, by both of the conveyer roller pair 60A and the discharge roller pair 62A, or substantially by the discharge roller pair 62A alone. Further, the rotation rates are adjusted by applying the correction values, which are selectively determined based on the positions of the spurs A-H in the spur roller 63 with respect to the image formed on the sheet S and the amount of the inks ejected to form the line of image. Thus, according to the rotation rate setting flow, the conveyer roller 60 and the discharge roller 62 are set to rotate in the desirably selected and corrected rotation rates.

According to the present embodiment, the nipping force in the conveyer roller pair 60A is greater than the nipping force of the discharge roller pair 62A; therefore, when the sheet S is nipped by both the conveyer roller pair 60A and the discharge roller pair 62A, and when the rotation rates to convey the sheet S are corrected, a rotation rate of the conveyer roller 60 in the conveyer roller pair 60A is adjusted to compensate a rotation rate of the discharge roller 62 in the discharge roller pair 62A. Meanwhile, when the sheet S is nipped substantially by the conveyer roller pair 60A alone, the rotation rate of the conveyer roller 60 alone is adjusted. When the sheet S is nipped substantially by the discharge roller pair 62A alone, the rotation rate of the discharge roller 62 alone is adjusted.

The rotation rate setting flow for the first side to be run by the CPU 91 will be described hereinbelow. When the flow is activated in S005 (see FIG. 12), in S100, the CPU 91 judges as to whether the current printing operation is for printing an image on the first side of the sheet S. When the current printing operation is for printing an image on the first side of the sheet S (S100: YES), in S110, the CPU 91 refers to the value detected by the rotary encoder 97 to judge as to whether the sheet S being conveyed has reached the discharge roller pair 62A. If the sheet S has not reached the discharge roller pair 62A (S110: NO) (see FIG. 6A), it is assumed that the sheet S is nipped by substantially the conveyer roller pair 60A alone. Therefore, in S111, the CPU 91 selects the rotation rate F0 indicated in the rotation rate correction table (T1) in Table 1 and stores F0 in the memory area 93E for rotation rate. The flow ends and returns to the main flow (see FIG. 12).

The sheet S is conveyed at the rotation rate set in the rotation rate setting flow for the first side (S006), a line Y of image is formed on the first side of the sheet S (S007). Further, the CPU 91 executes S008 and S009 in the main flow. In S009, if the image-forming has not been completed (S009: NO), the flow returns to S005 to execute the rotation rate setting flow.

When the image is being formed on the first side of the sheet S (S100: YES) (see FIG. 13), and when the sheet has reached the discharge roller pair 62A (S110: YES) (see FIG. 6B), in S120, the CPU 91 refers to the value detected by the rotary encoder 97 and judges as to whether the sheet S is released from the conveyer roller pair 60A. If the sheet S is not released from the conveyer roller pair 60A (S120: NO), it is assumed that the sheet S is nipped by both the conveyer roller pair 60A and the discharge roller pair 62A. Therefore, in S121, the CPU 91 selects the rotation rate F1 for the conveyer roller 60 indicated in the rotation rate correction table (T1) in Table 1 and stores F1 in the work area 93F. The flow proceeds to S122.

In S122, the CPU 91 refers to the memory area 93A for the position of the formed line Y of image and judges as to whether at least a part of the spur roller 63 falls on a straight-above position in the shaded area 400 to overlap the image. If the spur roller 63 is not in the vertically overlapping position (S122: NO), that is, if the image is not nipped by the discharge roller pair 62A, in S129, the conveyer roller 60 is rotated in the rotation rate F1 selected in S121 without being adjusted. Therefore, the CPU 91 stores F1 in the memory area 93E for rotation rate. The flow ends and returns to the main flow (see FIG. 12).

In S122, if at least a part of the spur roller 63 falls on a position to overlap the formed line Y of image in the shaded area 400 (S122: YES), it is assumed that the line Y of image is nipped by the discharge roller pair 62A. In S123, therefore, the CPU 91 determines the spurs A-H in the spur roller 63 falling on the position in the shaded area 400 and stores the identified spurs A-H in the work area 93F. According to the present example, as shown in FIG. 6B, four spurs B, C, D, E in the spur roller 63 are in the shaded area 400 to overlap the formed line Y of image. Therefore, information to identify the spurs B, C, D, E is stored in the work area 93F. Thereafter, in S124, the CPU 91 refers to the memory area 93D to obtain the amount of inks ejected to form the line Y of image in the shaded area 400. In the present example shown in FIG. 6B, the amount of ejected inks to form the shaded area 400 is K2 (unit: cc).

Based on the information concerning the spurs B, C, D, E stored in the work area 93F and the information concerning the amount of ejected inks stored in the memory area 93D, in S125, the CPU 91 selects the first correction parameter A (N) and the second correction parameter Px from T2 and T5 in Table 1. In particular, whilst the spurs B, C, D, and E are identified in the work area 93F, the values A (B), A (C), A (D), and A (E) are selected from T2 as the first correction parameters A (N). Further, whilst the amount of ejected inks indicates to be K2 (cc), the value P2 is selected from T5 as the second correction parameter Px. The flow proceeds to S126.

In S126, a correction value A, which is an average value of the selected first correction parameters A (N), is calculated. According to the present example, the correction value A is represented by an equation: A=(A (B)+A (C)+A (D)+A (E))/4. Further, in S126, the obtained correction value A and the second correction parameter Px are stored in the work area 93F. The flow proceeds to S127.

In S127, a final correction value X is calculated based on the correction value A and the second correction parameter Px stored in the work area 93F. The final correction value X is an average of the correction value A and the second correction parameter P2, and, according to the present example, the final correction value X is represented by an equation: X=(A+P2/

2). With the obtained final correction value X, in S128, the CPU 91 multiplies the rotation rate F1 selected in S121 by the final correction value X (F1*X) to obtain the rotation rate for the conveyer roller 60. The obtained rotation rate is stored in the memory area 93E for rotation rate. The flow ends thereafter and returns to the main flow (see FIG. 12).

In the main flow, in S006, the sheet S is conveyed at the rotation rate set in the rotation rate setting flow for the first side. Further, the CPU 91 executes S008-S009 in the main flow. In S009, if the image-forming has not been completed (S009: NO), the flow returns to S005 to activate the rotation rate setting flow (FIG. 13) for the first side.

In the rotation rate setting flow for the first side (S100: YES), when the sheet S being conveyed reaches the discharge roller pair 62A (S110: YES), in S120, it is judged as to whether the sheet S being conveyed is released from the conveyer roller pair 60A with reference to the value detected by the rotary encoder 97. When the sheet S is released from the conveyer roller pair 60A (S120: YES) (see FIG. 6C), it is assumed that the sheet S is nipped substantially by the discharge roller pair 62A alone. Therefore, in S131, the CPU 91 selects the rotation rate F2 for the discharge roller 62 indicated in the rotation rate correction table (T1) in Table 1 and stores F2 in the work area 93F. The flow proceeds to S123.

In S132, the CPU 91 refers to the memory area 93A for the position of the formed line Y of image and judges as to whether at least a part of the spur roller 63 falls on a position to overlap the line Y of image in the shaded area 400. If the spur roller 63 is not in the vertically overlapping position (S132: NO), in S139, the discharge roller 62 is rotated in the rotation rate F2 selected in S131 without being adjusted. Therefore, the CPU 91 stores F2 in the memory area 93E for rotation rate. The flow ends and returns to the main flow (see FIG. 12).

In S132, if at least a part of the spur roller 63 falls on a position to overlap the formed line Y of image in the shaded area 400 (S132: YES), the line Y of image is nipped by the discharge roller pair 62A. In S133, the CPU 91 determines the spurs A-H in the spur roller 63 falling on the position in the shaded area 400 and, stores the specified spur A-H in the work area 93F. According to the present example, as shown in FIG. 6C, two spurs B, C in the spur roller 63 are in the shaded area 400 to overlap the formed line Y of image. Therefore, information to identify the spurs B, C is stored in the work area 93F. Thereafter, in S134, the CPU 91 refers to the memory area 93D to obtain the amount of inks ejected to form the line Y of image in the shaded area 400. In the present example shown in FIG. 6C, the amount of ejected inks to form the shaded area 400 is K1 (unit: cc).

Based on the information concerning the spurs B, C stored in the work area 93F and the information concerning the amount of ejected inks stored in the memory area 93D, in S135, the CPU 91 selects the first correction parameter A (N) and the second correction parameter Px from T2 and T5 in Table 1. In particular, whilst the spurs B, C are identified in the work area 93F, the values A (B), A (C), are selected from T2 as the first correction parameters A (N). Further, whilst the amount of ejected inks indicates to be K1 (cc), the value P1 is selected from T5 as the second correction parameter Px. The flow proceeds to S136.

In S136, a correction value A, which is an average value of the selected first correction parameters A (N), is calculated. According to the present example, the correction value A is represented by an equation: $A=(A(B)+A(C))/2$. Further, in S136, the obtained correction value A and the second correction parameter Px are stored in the work area 93F. The flow proceeds to S137.

In S137, a final correction value X is calculated based on the correction value A and the second correction parameter Px stored in the work area 93F. The final correction value X is an average of the correction value A and the second correction parameter P1, and, according to the present example, the final correction value X is represented by an equation: $X=(A+P1)$. With the obtained final correction value X, in S138, the CPU 91 multiplies the rotation rate F2 selected in S131 by the final correction value X to obtain the rotation rate for the discharge roller 62 (F2*X). The obtained rotation rate is stored in the memory area 93E for rotation rate. The flow ends thereafter and returns to the main flow (see FIG. 12).

According to the above-described flows, the rotation rates of the conveyer roller pair 60A and the discharge roller pair 62A are determined based on the conditions of the roller pairs to nip the sheet S, the spurs A-H in the spur roller 63 to nip the line Y of image, and the amount of the inks ejected on the sheet S to form the line Y of image. Thus, the rotation rates to convey the sheet S can be adjusted finely to absorb the changes in the conditions and convey the sheet S steadily.

In the above-described flow, the quantity of the spurs A-H in the spur roller 63 is taken into consideration in order to set the rotation rate of the conveyer roller pair 60A and/or the discharge roller pair 62A. Whilst the quantity of the spurs A-H affects the nipping force of the conveyer roller pair 60A and/or the discharge roller pair 62A, the nipping force affects the conveying amount to convey the sheet S. Therefore, when the rotation rate of the conveyer roller pair 60A and/or the discharge roller pair 62A to convey the sheet S is set according to the quantity of the spurs A-H the sheet S can be conveyed preferably steadily in the conveying rate, which is adjusted in consideration of the variable nipping force.

Rotation Rate Setting Flow for the Second Side

Next, A rotation rate setting flow for the second side of the sheet S, which is run in S005 in the main flow (FIG. 12), will be described with reference to FIGS. 7-9 and 14-16. The rotation rate setting flow (see FIG. 14) for the second side of the sheet S includes a flow of steps, which follows an affirmative judgment in S010 (S010: YES) in FIG. 12, a negative judgment in S100 (S100: NO) in FIG. 13, and S101 in FIG. 13.

FIGS. 7A and 7B illustrate positions of the sheet S, which was reversed and has reached the conveyer roller pair 60A, the outline of the image formed on the first side (i.e., the lower surface) of the sheet S, and the driven roller 61 including the rollers a-h. In FIG. 7B, the sheet S has been forwarded in the direction 8 of depth from the position shown in FIG. 7A for the linefeed amount Y.

FIGS. 8A-8C illustrate positions of the sheet S, which is conveyed and reaches the discharge roller pair 62A to be nipped both by the conveyer roller pair 60A and the discharge roller pair 62A, outlines of the images formed on the first side (i.e., the lower surface) and on the second side (i.e., the upper surface), the driven roller 61, and the spur roller 63. In FIG. 8B, the sheet S has been forwarded in the direction 8 of depth from the position shown in FIG. 8A for the linefeed amount Y. In FIG. 8C, the sheet S has been forwarded in the direction 8 of depth from the position shown in FIG. 8B for the linefeed amount Y.

FIGS. 9A and 9B illustrate positions of the sheet S, which reaches the discharge roller pair 62A, the outlines of the images formed on the first side (i.e., the lower surface) and on the second side (i.e., the upper surface), the driven roller 61 and the spur roller 63. In FIG. 9B, the sheet S has been forwarded in the direction 8 of depth from the position shown in FIG. 9A for the linefeed amount Y and is released from the nipping force of the conveyer roller pair 60A.

In FIGS. 7A-9B, a shaded area 400 with hatched lines inclining to be lower at the right-hand side represents a part of the image formed in a single linefeed Y on the upper surface (i.e., the second side) of the sheet S and indicates an area, which may vertically overlap at least a part of the spur roller 63. Meanwhile, a shaded area 500 with hatched lines inclined to be lower at the left-hand side represents a part of the image formed in the single linefeed Y appearing on the lower surface (i.e., the first side) of the sheet S and indicates an area, which may vertically overlap at least part of the driven roller 61 or the spur roller 63. Clearance between two dash-and-dot lines indicates the amount of the linefeed Y.

In the rotation rate setting flow for the second side, rotation rates for the conveyer roller 60 and/or the discharge roller 62 are selectively determined depending on whether the sheet S is nipped substantially by the conveyer roller pair 60A alone, by both of the conveyer roller pair 60A and the discharge roller pair 62A, or substantially by the discharge roller pair 62A alone. Further, the rotation rates are adjusted by applying correction values, which are selectively determined based on the positions of the rollers a-h in the driven roller 61 and/or the spurs A-H in the spur roller 63 with respect to the image formed on the first side of the sheet S, the position of the spurs A-H with respect to the image foamed on the second side of the sheet S, and the amount of the inks ejected to form the line of image. Thus, according to the rotation rate setting flow, the conveyer roller 60 and the discharge roller 62 are set to rotate in the desirably selected and corrected rotation rates.

In the rotation rate setting flow for the second side, similarly to the rotation rate setting flow for the first side, when the rotation rates to convey the sheet S are corrected, a rotation rate of the conveyer roller 60 in the conveyer roller pair 60A is adjusted to compensate a rotation rate of the discharge roller 62 in the discharge roller pair 62A. Meanwhile, when the sheet S is nipped substantially by the conveyer roller pair 60A alone, the rotation rate of the conveyer roller 60 is adjusted. When the sheet S is nipped substantially by the discharge roller pair 62A alone, the rotation rate of the discharge roller 62 is adjusted.

The rotation rate setting flow for the second side to be run by the CPU 91 will be described hereinbelow. The rotation rate setting flow (see FIG. 14) for the second side of the sheet S includes a flow of steps, which follows an affirmative judgment in S010 (S010: YES) in FIG. 12, a negative judgment in S100 (S100: NO) in FIG. 13, and S101 in FIG. 13.

When the rotation rate setting flow for the second side is activated, in S200, the CPU 91 refers to the value detected by the rotary encoder 97 to judge as to whether the sheet S being conveyed has reached the discharge roller pair 62A. If the sheet S has not reached the discharge roller pair 62A (S200: NO) (see FIGS. 7A and 7B), it is assumed that the sheet S is nipped by substantially the conveyer roller pair 60A. Therefore, in S201, the CPU 91 selects the rotation rate F0 indicated in the rotation rate correction table (T1) in Table 1 and stores F0 in the work area 93F. The flow proceeds to S202.

In S202, the CPU 91 refers to the memory area 93A for the position of the line of image formed on the first side and judges as to whether at least a part of the driven roller 61 falls on a straight-below position to vertically overlap the image in the shaded area 500 on the first side. If the driven roller 61 is not in the vertically overlapping position (S202: NO) (see FIG. 7A), in S209, the conveyer roller 60 is rotated in the rotation rate F0 selected in S201 without being adjusted. Therefore, the CPU 91 stores F0 in the memory area 93E for rotation rate. The flow ends and returns to the main flow (see FIG. 12).

In S202, if at least a part of the driven roller 61 falls on a straight-below position to overlap the line of image in the shaded area 500 formed on the first side (S202: YES), the line of image is nipped by the conveyer roller pair 60A. In S203, the CPU 91 determines the rollers a-h in the driven roller 61 falling on the position in the shaded area 500 and stores the rollers a-h in the work area 93F. According to the present example, as shown in FIG. 7B, four rollers b, c, d, e in the driven roller 61 fall on the shaded area 500 to overlap the line of image formed on the first side. Therefore, information to identify the rollers b, c, d, e is stored in the work area 93F. Thereafter, in S204, the CPU 91 refers to the memory area 93D to obtain the amount of inks ejected to form the line of image formed on the first side in the shaded area 500. In the present example shown in FIG. 7B, the amount of ejected inks to form the shaded area 500 is K3 (unit: cc).

Based on the information concerning the rollers b, c, d, e stored in the work area 93F and the information concerning the amount of ejected inks stored in the memory area 93D, in S205, the CPU 91 selects the first correction parameter B1 (n) and the second correction parameter Px from T3 and T5 in Table 1. In particular, whilst the rollers b, c, d, e are identified in the work area 93F, the values B1 (b), B1 (c), B1 (d), and B1 (e) are selected from T3 as the first correction parameters B1 (n). Further, whilst the amount of ejected inks indicates K3 (cc), the value P3 is selected from T5 as the second correction parameter Px. The flow proceeds to S206.

In S206, a correction value B1, which is an average value of the selected first correction parameters B1 (n), is calculated. According to the present example, the correction value B1 is represented by an equation: B1=(B1 (b)+B1 (c)+B1 (d)+B1 (e))/4. Further, in S206, the obtained correction value B1 and the second correction parameter Px are stored in the work area 93F. The flow proceeds to S207.

In S207, a first final correction value X1 is calculated based on the correction value B1 and the second correction parameter Px stored in the work area 93F. The first final correction value X1 is an average of the correction value B1 and the second correction parameter P3, and, according to the present example, the first final correction value X1 is represented by an equation: X1=(B1+P3)/2. With the obtained first final correction value X1, in S208, the CPU 91 multiplies the rotation rate F0 selected in S201 by the first final correction value X1 to obtain the rotation rate for the conveyer roller 60 (F0*X1). The obtained rotation rate is stored in the memory area 93E for rotation rate. The flow ends thereafter and returns to the main flow (see FIG. 12).

According to the above-described flow, when the image is formed on the second side of the sheet S after completion of the image forming on the first side, the rollers a-h may fall on the straight-below positions to vertically overlap the image formed on the first side. In this regard, the rotation rate of the conveyer roller 60 is determined based on the conditions of the rollers a-h to overlap the line Y of image on the first side, and the amount of the inks ejected on the sheet S to form the line Y of the image. Thus, the rotation rate to convey the sheet S can be adjusted finely to absorb the changes in the conditions and convey the sheet S steadily.

The sheet S is conveyed at the rotation rate set in the rotation rate setting flow for the second side (S006), and the flow repeats S007-S009. In S010, when the CPU 91 determines that forming an image on the second side of the sheet S is required (S010: YES), in S012, the CPU reverses the sheet S and returns to S002 to repeat S002-S005. The flow proceeds to execute the rotation rate setting flow for the second side (S100: NO) and to S101. In the rotation rate setting flow for the second side, in S200, the CPU 91 refers to the value detected by the rotary encoder 97 to judge as to whether the sheet S being conveyed has reached the discharge roller pair 62A. If the sheet S has reached the discharge roller pair 62A (S200: YES), in S210, the CPU 91 refers to the value detected by the rotary encoder 97 and judges as to whether the sheet S is released from the conveyer roller pair 60A. If the sheet S is not released from the conveyer roller pair 60A (S210: NO), it is assumed that the sheet S is nipped by both the conveyer roller pair 60A and the discharge roller pair 62A. Therefore, in S211, the CPU 91 selects the rotation rate F1 for the conveyer roller 60 indicated in the rotation rate correction table (T1) in Table 1 and stores F1 in the work area 93F. The flow proceeds to S212.

In S212, the CPU 91 refers to the memory area 93A for the position of the formed line of image and judges as to whether at least a part of the driven roller 61 falls on a straight-below position to vertically overlap the image formed on the first side in the shaded area 500 or at least a part of the spur roller 63 falls on a straight-above position to vertically overlap the image formed on the first side in the shaded area 500. If none of the driven roller 61 or the spur roller 63 is in the position to overlap the image formed on the first side (S212: NO), in S215, the conveyer roller 60 is rotated in the rotation rate F1 selected in S211 without being adjusted.

In S212, at least a part of the driven roller 61 or a part of the spur roller 63 falls on the vertically overlapping position (see FIGS. 8A-8C) (S212: YES), the flow proceeds to S213, in which correction value calculating flow (see FIG. 15) is executed.

Figure 15:
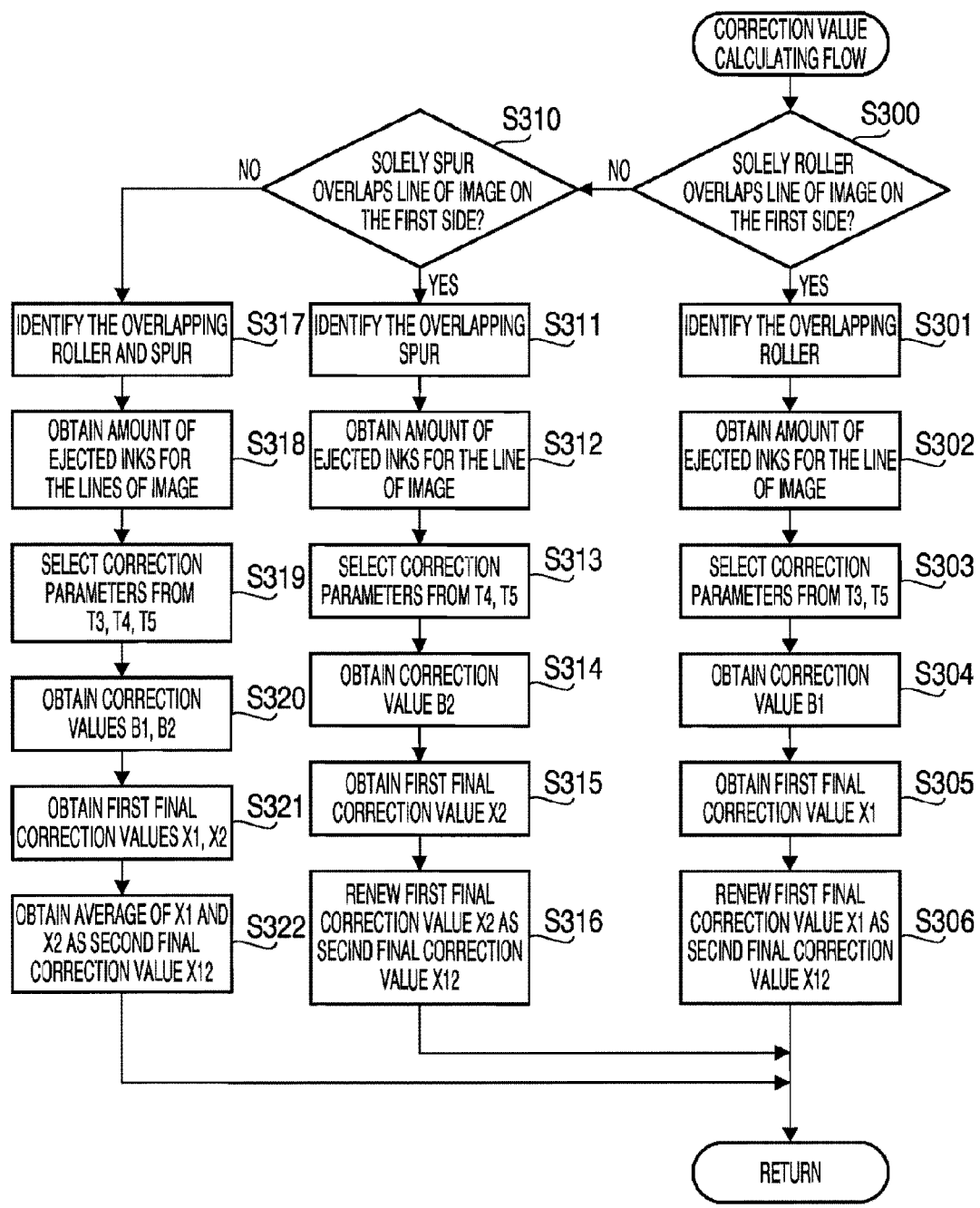
FIG. 15 is a flowchart to illustrate a correction value calculating flow to be executed by the controller unit 90 in the MFP 1 according to the embodiment of the present invention.

The correction value calculating flow will be described with reference to FIG. 15. In S300, the CPU 91 judges as to whether solely the driven roller 61 between the driven roller 61 and the spur roller 63 falls on the vertically overlapping position in the shaded area 500 to overlap the image on the first side. When solely the driven roller 61 falls on the vertically overlapping position (see FIG. 8A) (S300: YES), in S301, the CPU 91 determines the rollers a-h in the driven roller 61 falling on the position in the shaded area 500 and stores the specified rollers a-h in the work area 93F. According to the present example, as shown in FIG. 8A, two rollers b, c in the driven roller 61 are in the shaded area 500 to overlap the line of image formed on the first side. Therefore, information to identify the rollers b, c is stored in the work area 93F. In S302, the CPU 91 refers to the memory area 930 to obtain the amount of inks ejected to form the line of image formed on the first side in the shaded area 500. In the present example shown in FIG. 8A, the amount of ejected inks to form the shaded area 500 is K1 (unit: cc).

Based on the information concerning the rollers b, c stored in the work area 93F and the information concerning the amount of ejected inks stored in the memory area 93D, in S303, the CPU 91 selects the first correction parameter B1 (n) and the second correction parameter Px from T3 and T5 in Table 1. In particular, whilst the rollers b, c are identified in the work area 93F, the values B1 (b) and B1 (c) are selected from T3 as the first correction parameters B1 (n). Further, whilst the amount of ejected inks indicates to be K1 (cc), the value P1 is selected from T5 as the second correction parameter Px. The flow proceeds to S304.

In S304, a correction value B1, which is an average value of the selected first correction parameters B1 (n), is calculated. According to the present example, the correction value B1 is represented by an equation: $B1=(B1(b)+B1(c))/2$. Further, in S304, the obtained correction value B1 and the second correction parameter Px are stored in the work area 93F. The flow proceeds to S305.

In S305, a first final correction value X1 is calculated based on the correction value B1 and the second correction parameter Px stored in the work area 93F. The first final correction value X1 is an average of the correction value B1 and the second correction parameter P1, and, according to the present example, the first final correction value X1 is represented by an equation: $X1=(B1+P1)/2$. In S306, the obtained first final correction value X1 is renewed as a second final correction value X12. The renewed second final correction value X12 is stored in the work area 93F. The flow ends thereafter.

In S300, when not solely the driven roller 61 falls on the vertically overlapping position (S300: NO), in S310, the CPU 91 judges as to whether solely the spur roller 63 between the driven roller 61 and the spur roller 63 falls on the vertically overlapping position to overlap the image in the shaded area 500 on the first side (i.e., no part of the driven roller 61 falls on the vertically overlapping position). When not solely the driven roller 61 falls on the vertically overlapping position but the spur roller 63 also falls on the vertically overlapping position (see FIG. 8B) (S310: NO), in S317, the CPU 91 determines the rollers a-h in the driven roller 61 falling on the position in the shaded area 500 and the spurs A-H in the spur roller 63 falling on the position in the shaded area 500. Further, the CPU 91 stores the specified rollers a-h and the spurs A-H in the work area 93F. According to the present example, as shown in FIG. 8B, two rollers b, c in the driven roller 61 and four spurs B, C, D, E in the spur rollers 63 are in the shaded areas 500 to overlap the lines of images formed on the first side. Therefore, information to identify the rollers b, c and the spurs B, C, D, E is stored in the work area 93F.

Thereafter, in S318, the CPU 91 refers to the memory area 93D to obtain the amount of inks ejected to form the lines of images formed on the first side in the shaded areas 500. In the present example shown in FIG. 8B, the amount of ejected inks to form the shaded area 500 to overlap the rollers b, c is K1 (unit: cc), and the amount of ejected inks to form the shaded area 500 to overlap the spurs B, C, D, E is K3 (cc). The flow proceeds to S319.

Based on the information concerning the rollers b, c and the spurs B, C, D, E stored in the work area 93F and the information concerning the amount of ejected inks stored in the memory area 93D, in S319, the CPU 91 selects the first correction parameters B1 (n), B2 (N) and the second correction parameter Px from T3, T4, and T5 in Table 1. In particular, whilst the rollers b, c are identified in the work area 93F, the values B1 (b) and B1 (c) are selected from T3 as the first correction parameters B1 (n). Further, whilst the amount of ejected inks to form the shaded area 500 overlapping the rollers b, c indicate K1 (cc), the value P1 is selected from T5 as the second correction parameter Px. Meanwhile, the spurs B, C, D, E are identified in the work area 93F, the values B2 (B), B2 (C), B2 (D), and B2 (E) are selected from T4 as the first correction parameters B2 (N). Further, whilst the amount of ejected inks to form the shaded area 500 overlapping the spurs B, C, D, E indicates K3 (cc), the value P3 is selected from T5 as the second correction parameter Px.

In S320, a correction value B1, which is an average value of the selected first correction parameters B1 (n), and a correction value B2, which is an average value of the selected first correction parameter B2 (N), are calculated. According to the present example, the correction value B1 is represented by an equation: $B1=(B1(b)+B1(c))/2$, and the correction value B2 is represented by an equation: $B2=(B2(B)+B2(C)+B2(D)+B2(E))/4$. Further, in S320, the obtained correction values B1, B2, and the second correction parameter Px are stored in the work area 93F. The flow proceeds to S321.

In S321, first final correction values X1, X2 are calculated based on the correction values B1 (n), B2 (N), and the second correction parameter Px stored in the work area 93F. The first final correction value X1 is an average of the correction value B1 and the second correction parameter P1 when the driven roller 61 overlaps the image on the first side. According to the present example, the first final correction value X1 is represented by an equation: X1=(B1+P1)/2. The first final correction value X2 is an average of the correction value B2 and the second correction parameter P3 when the spur roller 63 overlaps the image on the first side. According to the present example, the first final correction value X2 is represented by an equation: X2=(B2+P3)/2. The flow proceeds to S322.

In S322, a second final correction value X12, which is an average of the first final correction values X1 and X2, is obtained. According to the present example, the second final correction value X12 is represented by an equation: X12=(X1+X2)/2. The obtained second final correction value X12 is stored in the work area 93F. The flow ends thereafter.

In S300, when not solely the driven roller 61 falls on the vertically overlapping position (S300: NO), in S310, the CPU 91 judges as to whether solely the spur roller 63 between the driven roller 61 and the spur roller 63 falls on the vertically overlapping position to overlap the image in the shaded area 500 on the first side. When solely the spur roller 63 falls on the vertically overlapping position (see FIG. 8C) (S310: YES), in S311, the CPU 91 determines the spurs A-H falling on the vertically overlapping position in the shaded area 500 and stores the specified spurs A-H in the work area 93F. According to the present example, as shown in FIG. 8C, two spurs B, C in the spur roller 63 are in the shaded area 500 to overlap the line of image formed on the first side. Therefore, information to identify the spurs B, C is stored in the work area 93F. Thereafter, in S312, the CPU 91 refers to the memory area 93D to obtain the amount of inks ejected to form the line of image formed on the first side in the shaded area 500. In the present example shown in FIG. 8C, the amount of ejected inks to form the shaded area 500 is K1 (unit: cc).

Based on the information concerning the spurs B, C stored in the work area 93F and the information concerning the amount of ejected inks stored in the memory area 93D, in S313, the CPU 91 selects the first correction parameter B2 (N) and the second correction parameter Px from T4 and T5 in Table 1. In particular, whilst the spurs B, D are identified in the work area 93F, the values B2 (B) and B2 (C) are selected from T4 as the first correction parameters B2 (N). Further, whilst the amount of ejected inks indicates to be K1 (cc), the value P1 is selected from T5 as the second correction parameter Px. The flow proceeds to S314.

In S314, a correction value B2, which is an average value of the selected first correction parameters B2 (N), is calculated. According to the present example, the correction value B2 is represented by an equation: B2=(B2 (B)+B2 (C))/2. Further, in S314, the obtained correction value B2 and the second correction parameter Px are stored in the work area 93F. The flow proceeds to S315.

In S315, a first final correction value X2 is calculated based on the correction value B2 and the second correction parameter Px stored in the work area 93F. The first final correction value X2 is an average of the correction value B2 and the second correction parameter P1, and, according to the present example, the first final correction value X2 is represented by an equation: X2=(B2+P1)/2. In S316, the obtained first final correction value X2 is renewed as a second final correction value X12. The renewed second final correction value X12 is stored in the work area 93F. The correction value calculating flow ends thereafter and returns to the rotation rate setting flow for the second side (see FIG. 14). The flow proceeds to S214.

In S214, the CPU 91 multiplies the rotation rate F1 selected in S211 by the second final correction value X12 to obtain the rotation rate for the conveyer roller 60 (F1*X12). The obtained rotation rate is stored in the work area 93F. The flow proceeds to S230 (see FIG. 16).

In S230, the CPU 91 judges as to whether at least a part of the spur roller 63 falls on a straight-above position in the shaded area 400, which appears on the upper surface of the sheet S, to vertically overlap the image formed on the second side. When at least a part of the spur roller 63 falls on the vertically overlapping position (see FIGS. 8B and 8C) (S230: YES), in S231, the CPU 91 determines the spurs A-H falling on the vertically overlapping position in the shaded area 400 and stores the specified spurs A-H in the work area 93F. According to the present example, as shown in FIGS. 8B and 8C, four spurs D, E, F, G in the spur roller 63 are in the shaded area 400 to overlap the line of image formed on the second side. Therefore, information to identify the spurs D, E, F, G is stored in the work area 93F. Thereafter, in S232, the CPU 91 refers to the memory area 93D to obtain the amount of inks ejected to form the line of image formed on the second side in the shaded area 400. In the present example shown in FIGS. 8B and 8C, the amount of ejected inks to form the shaded area 500 is K3 (unit: cc).

Based on the information concerning the spurs D, E, F, G stored in the work area 93F and the information concerning the amount of ejected inks stored in the memory area 93D, in S233, the CPU 91 selects the first correction parameter A (N) and the second correction parameter Px from T2 and T5 in Table 1. In particular, whilst the spurs D, E, F, G are identified in the work area 93F, the values A (D), A (E), A (F), A (G) are selected from T2 as the first correction parameters A (N). Further, whilst the amount of ejected inks indicates to be K3 (cc), the value P3 is selected from T5 as the second correction parameter Px. The flow proceeds to S234.

In S234, a correction value A, which is an average value of the selected first correction parameters A (N), is calculated. According to the present example, the correction value A is represented by an equation: A=(A (D)+A (E)+A (F)+A (G))/4. Further, in S234, the obtained correction value A and the second correction parameter Px are stored in the work area 93F. The flow proceeds to S235.

In S235, a third final correction value Y is calculated based on the correction value A and the second correction parameter Px stored in the work area 93F. The third final correction value Y is an average of the correction value A and the second correction parameter P3, and, according to the present example, the third final correction value Y is represented by an equation: Y=(A+P3)/2. With the obtained third final correction value Y, in S236, the CPU 91 multiplies the rotation rate F2 by the third final correction value Y to obtain the rotation rate (F2*Y). The obtained rotation rate is stored in the work area 93F. The flow proceeds to S237.

In S237, the CPU 91 judges as to whether at least one of a part of the driven roller 61 and the spur roller 63 falls on a straight-below or straight-above position to vertically overlap the image in the shaded area 500 formed on the first side. If at least one of a part of the driven roller 61 and the spur roller 63 falls on the position to overlap the image on the first side (see FIGS. 8B and 8C) (S237: YES), in S238, the CPU 91 calculates a rotation rate FAV, which is an average rate of the rotation rate F1*X12 obtained in S214 and the rotation rate F2*Y obtained in S235. According to the present example, the rotation rate FAV is represented by an equation: FAV=

((F1*X12)+(F2*Y))/2. Further, in S239 the obtained rotation rate FAV is stored in the memory area 93E for rotation rate 93F. The rotation sate setting flow for second side ends thereafter, and the flow returns to the main flow (see FIG. 12). In the present embodiment, when the sheet S is in the positions shown in FIGS. 8B and 8C, the rotation rate FAV is the rotation rate for the conveyer roller 60.

According to the above-described flow, when the line of image formed on the first side of the sheet S is nipped by at least one of the conveyer roller pair 60A and the discharge roller pair 62A (see FIGS. 8B and 8C), the rotation rate of the conveyer roller 60 is determined based on the conditions of the driven roller 61 and the spur roller 63 to overlap the images on the first and second sides, and the amount of the inks ejected on the sheet S to form the images. Thus, the rotation rate to convey the sheet S can be adjusted finely to absorb the changes in the conditions, and the sheet S can be conveyed steadily.

Further, even when the image formed on the first side and the image formed on the second side vertically overlap each other with the spur roller 63 on the straight-above position to overlap the two overlapping images (see FIG. 8B), the rotation rate of the conveyer roller 60 is adjusted based on the condition. Thus, the rotation rate to convey the sheet S can be adjusted even more desirably.

In the main flow, the sheet S is conveyed at the rotation rate set in the rotation rate setting flow (S006), and the image is formed on the first side of the sheet S (S007). Further, the CPU 91 executes S008-S010. In S010, when the CPU 91 determines that forming an image on the second side of the sheet S is required (S010: YES), in S012, the CPU reverses the sheet S and returns to S002 to repeat S002-S005. The flow proceeds to execute the rotation rate setting flow for the second side (S100: NO) and to S101. In the rotation rate setting flow for the second side, in S200, the CPU 91 refers to the value detected by the rotary encoder 97 to judge as to whether the sheet S being conveyed has reached the discharge roller pair 62A. If the sheet S has reached the discharge roller pair 62A (S200:YES), in S210, the CPU 91 refers to the value detected by the rotary encoder 97 and judges as to whether the sheet S is released from the conveyer roller pair 60A. If the sheet S is released from the conveyer roller pair 60A (S210: YES), it is assumed that the sheet S is nipped substantially by the discharge roller pair 62A alone (see FIGS. 9A, 9B). Therefore, in S220, the CPU 91 selects the rotation rate F2 for the discharge roller 62 indicated in the rotation rate correction table (T1) in Table 1 and stores F2 in the work area 93F. The flow proceeds to S221.

Figure 16:
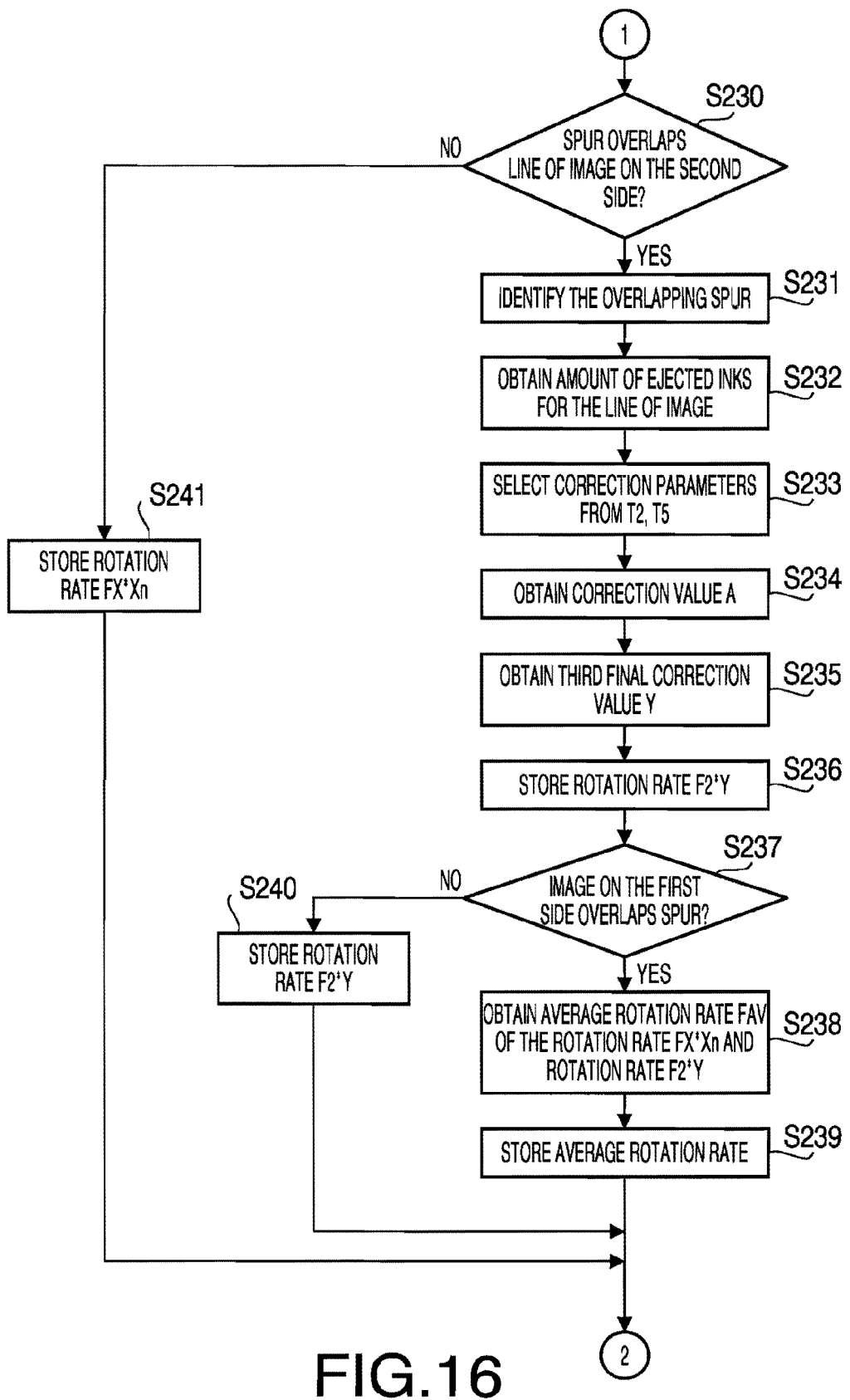
FIG. 16 is a flowchart continuous from the second rotation rate setting flow shown in FIG. 14.

In S221, the CPU 91 refers to the memory area 93A for the position of the line of image formed on the first side (i.e., the lower surface) of the sheet S and judges as to whether at least a part of the spur roller 63 falls on a position to overlap the line of image formed on the first side. If no spur A-H in the spur roller 63 is in a vertically overlapping position (see FIG. 9A) (S221: NO), in S228, the discharge roller 62 is rotated in the rotation rate F2 selected in S220 without being adjusted. Therefore, the CPU 91 stores the rotation rate F2 in the work area 93F. The flow proceeds to S230 (FIG. 16).

In S221, if at least a part of the spur roller 63 falls on a position to overlap the formed line of image in the shaded area 500 (S221: YES) (see FIG. 9B), the image on the first side is nipped by the discharge roller pair 62A. In S222, the CPU 91 determines the spurs A-H falling on the shaded area 500 and stores the specified spur A-H in the work area 93F. According to the present example, as shown in FIG. 9B, two spurs B, C in the spur roller 63 are in the shaded area 500 to overlap the line of image formed on the first side of the sheet S. Therefore, information to identify the spurs B, C is stored in the work area 93F. Thereafter, in S223, the CPU 91 refers to the memory area 93D to obtain the amount of inks ejected to form the line of image in the shaded area 500. In the present example shown in FIG. 9B, the amount of ejected inks to form the shaded area 500 is K1 (unit: cc).

Based on the information concerning the spurs B, C stored in the work area 93F and the information concerning the amount of ejected inks stored in the memory area 93D, in S224, the CPU 91 selects the first correction parameter B2 (N) and the second correction parameter Px from T4 and T5 in Table 1. In particular, whilst the spurs B, C are identified in the work area 93F, the values B2 (B), B2 (C), are selected from T4 as the first correction parameters B2 (N). Further, whilst the amount of ejected inks indicates to be K1 (cc), the value P1 is selected from T5 as the second correction parameter Px. The flow proceeds to S225.

In S225, a correction value B2, which is an average value of the selected first correction parameters B2 (N), is calculated. According to the present example, the correction value B2 is represented by an equation: B2=(B2 (B)+B2 (C))/2. Further, in S225, the obtained correction value B2 and the second correction parameter Px are stored in the work area 93F. The flow proceeds to S226.

In S226, a first final correction value X2 is calculated based on the correction value B2 and the second correction parameter Px stored in the work area 93F. The first final correction value X2 is an average of the correction value B2 and the second correction parameter P1, and, according to the present example, the final correction value X2 is represented by an equation: X2=(B2+P1). With the obtained first final correction value X2, in S227, the CPU 91 multiplies the rotation rate F2 selected in S220 by the final correction value X2 to obtain the rotation rate for the discharge roller 6 (F2*X2)2. The obtained rotation rate is stored in the work area 93F. The flow proceeds to S230 (see FIG. 16).

In S230, the CPU 91 judges as to whether at least a part of the spur roller 63 falls on a straight-above position in the shaded area 400, which appears on the upper surface of the sheet S, to vertically overlap the image formed on the second side. When no spur roller 63 falls on the vertically overlapping position (S230: NO), in S241, the CPU 91 stores one of the rotation rate F2 selected in S228 and the rotation rate F2*X2 obtained in S226 to be the rotation rate for the discharge roller 62 in the work area 93F. The rotation rate setting flow for the second side ends thereafter, and the flow returns to the main flow (FIG. 12).

In S230, when at least a part of the spur roller 63 falls on the vertically overlapping position to overlap the shaded area 400 (see FIGS. 9A and 9B) (S230: YES), the flow proceeds to S231. The steps S231-S236 are executed as has been described above.

In S237, the CPU 91 judges as to whether at least one of a part of the driven roller 61 and the spur roller 63 falls on a straight-below or straight-above position in the shaded area 500 to vertically overlap the image formed on the first side. If none of the driven roller 61 or the spur roller 63 falls on the position to overlap the image on the first side (see FIG. 9A) (S237: NO), in S240, the CPU 91 stores the rotation rate F2*Y obtained in S236 in the memory area 93E for rotation rate to be the rotation rate for the discharge roller 62. The flow returns to the main flow (see FIG. 12).

In S237, if at least one of a part of the driven roller 61 and the spur roller 63 falls on the position to overlap the image on the first side in the shaded area 500 (see FIG. 9B) (S237: YES), in S238, the CPU 91 calculates a rotation rate FAV, which is an average rate of the rotation rate F2*X12 obtained in S226 and the rotation rate F2*Y obtained in S235. According to the present example, the rotation rate FAV is represented by an equation: FAV=((F2*X12)+(F2*Y))/2. Further, in S239, the obtained rotation rate FAV is stored in the memory area 93E for rotation rate 93F. The rotation sate setting flow for second side ends thereafter, and the flow returns to the main flow (see FIG. 12). In the present embodiment, when the sheet S is in the position shown in FIGS. 9B and 9C, the rotation rate FAV is the rotation rate for the conveyer roller 62.

According to the above-described flows, the rotation rates of the conveyer roller pair 60A and the discharge roller pair 62A to convey the sheet S are determined based on the conditions of the roller pairs to nip the sheet S, the spurs A-H to overlap the lines Y of images, and the amount of the inks ejected on the sheet S to form the lines Y of images even when the image is formed on the second side of the sheet S in addition to the first side. Thus, the rotation rates to convey the sheet S can be adjusted even more finely to absorb the changes in the conditions, and the sheet S can be conveyed steadily.

Although an example of carrying out the invention have been described, those skilled in the art will appreciate that there are numerous variations and permutations of the image recording apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the above-described flows of steps to adjust the rotation rates of the conveyer roller pair 60A and the discharge roller pair 62A can be effectively applied even when forming images, which are identical in size and an amount of the ejected inks thereof but different in positions in the widthwise direction 9 (see FIGS. 10A and 10B). In FIGS. 10A and 10B, the images formed on the upper surfaces of the sheets S are identical in size and an amount of the ejected inks but different in the widthwise positions thereof. The shaded area 400 illustrates a part of the image formed in a single linefeed Y on the upper surface of the sheet S and indicates an area, on which at least part of the spur roller 63 overlaps.

In FIG. 10A, the shaded area 400 in the image overlaps three spurs B, C, D amongst the spurs A-H in the spur roller 63. Therefore, the correction parameters A (B), A (C), A (D) are selected to be the correction parameter A (N) from T2 in Table 1. Further, a correction value A is obtained from an equation A=(A (B)+A (C)+A (D))/3. In FIG. 10B, on the other hand, the shaded area 400 overlaps two spurs F, G in the spur roller 63. Therefore, the correction parameters A (F), A (G) are selected to be the correction parameter A (N) from T2 in Table 1. Further, a correction value A is obtained from an equation A=(A (F)+A (G))/2. Meanwhile, with the sheets S being released from the conveyer roller pair 60A, the rotation rate F2 is selected for the discharge roller 62 shown in both FIGS. 10A and 10B. Furthermore, with the amount of ejected inks being K2 (cc), the value P2 is selected from T5 as the second correction parameter Px for the discharge roller 62 shown in both FIGS. 10A and 10B.

Thus, whilst the rotation rate F2 and the correction parameter P2 are identical between the image-forming operation in FIGS. 10A and 10B, the correction values A are different from each other. Therefore, according to the rotation rate setting flows described above, the rotation rates can be finely adjusted to convey the sheet S steadily in each of the image-forming operations. It is to be noted that the rotation rates can be similarly finely adjusted to convey the sheets S steadily even when the two identical images are formed in different widthwise positions on the sheets S respectively and reversed to have the driven roller 61 in vertically overlapping positions.

For another example, the above-described flows of steps to adjust the rotation rates of the conveyer roller pair 60A and the discharge roller pair 62A can be effectively applied even when quantities of the spurs A-H overlapping the images are identical between two image-forming operations or when forming images, which are identical in size and an amount of the ejected inks thereof but different in positions in the widthwise direction 9 (see FIGS. 11A and 1B). In FIGS. 11A and 11B, the images formed on the upper surfaces of the sheets S are identical in size and an amount of the ejected inks but different in the widthwise positions thereof. The shaded area 400 illustrates a part of the image formed in a single linefeed Y on the upper surface of the sheet S and indicates an area, on which at least part of the spur roller 63 overlaps.

When the image is formed, in S004 in the main flow (see FIG. 12), the positions of the widthwise ends of the sheet S are detected and stored in the memory area 93C for widthwise end positions. With the positions of the widthwise ends of the sheet S being stored, a position of the image formed on the sheet S can be recognized based on the position of the sheet S on the platen 34.

In FIG. 11A, the shaded area 400 in the image overlaps three spurs B, C, D in the spur roller 63. Therefore, the correction parameters A (B), A (C), A (D) are selected to be the correction parameter A (N) from T2 in Table 1. Further, a correction value A is obtained from an equation A=(A (B)+A (C)+A (D))/3.

In FIG. 11B, on the other hand, the shaded area 400 overlaps three spurs C, D, E in the spur roller 63. Therefore, the correction parameters A (C), A (D), A (E) are selected to be the correction parameter A (N) from T2 in Table 1. Further, a correction value A is obtained from an equation A=(A (C)+A (D)+A (E))/3. Meanwhile, with the sheets S being released from the conveyer roller pair 60A, the rotation rate F2 is selected for the discharge roller 62 shown in both FIGS. 11A and 11B. Furthermore, with the amount of ejected inks being K2 (cc), the value P2 is selected from T5 as the second correction parameter Px for the discharge roller 62 shown in both FIGS. 11A and 11B.

Thus, whilst the rotation rate F2 and the correction parameter P2 are identical between the image-forming operation in FIGS. 11A and 11B, the correction values A are different from each other due to the difference of the spurs B, C, D and C, D, E to nip the image. Therefore, according to the rotation rate setting flows described above, the rotation rates can be finely adjusted to convey the sheet S steadily in each of the image-forming operations based on the spurs A-H to nip the image. It is to be noted that the rotation rates can be similarly finely adjusted to convey the sheets S steadily even when the two identical images are formed in different widthwise positions on the sheets S respectively and reversed to have the driven roller 61 in vertically overlapping positions.

In the examples described above, the images to be formed on the sheets S are represented by figures (see FIGS. 6-11). However, the images to be formed on the sheet S may not necessarily figures but may be, for example, text including characters. When printing characters which may be finer than the figures, a correction parameter Px for the amount of inks ejected to form the characters may be selected from T6 in Table 1, in which correction parameters PX for smaller amounts of inks to be ejected to form a line Y of image are defined. In this regard, the ink amount K1 (cc) may define a smaller amount. Thus, the second correction parameter Px being 0 may be selected for the smaller ink amount K1. When text with smaller-sized thinner characters is printed, the amount of inks to be ejected for the text may be relatively small. When the amount of inks to be ejected is smaller, changes in conditions of the sheet S due to the ejected inks may be smaller for printing the smaller-sized characters, and the smaller changes in conditions may affect the sheet-conveying amount of the roller pairs to smaller extent. Therefore, the rotation rates for the conveyer roller pair 60A and/or the discharge roller pair 62A may not necessarily be corrected when the finer characters are printed on the sheet S.

When text including larger-sized thicker characters is printed, on the other hand, an ink amount greater than K1 (cc) in T6 in Table 1 may be used to form the line Y of image. Therefore, T6 in Table 1 may further define ink amounts K2 and K3 (cc), which are greater than K1. Thus, a second correction parameter Px for the greater amount of inks to be ejected to form the line Y of image, which includes larger-sized characters, may be effectively selected.

In other words, an effective correction parameter can be selected to convey the sheet S in a preferably steady rate regardless of a size of characters to be printed.

In the above-described embodiment, whilst the spur roller 63 includes eight spurs A-H and the driven roller 61 includes eight rollers a-h, eight correction parameters are prepared for each of the spurs A-H and the rollers a-h (see FIGS. 6-11 and Table 1). However, the quantity of the spurs in the spur roller 63 or the rollers in the driven roller 61 may not limited to eight but may be increased or reduced arbitrarily. Further, the quantities of the correction parameters Px for the amount of ejected inks may not limited to those illustrated in T5 and T6 in Table 1 but may be increased of reduced arbitrarily.

In the above-described embodiment, the inks are used as the recording agent to form the images. However, the recording agent may not necessarily be the inks but may be, for example, toner. When the toner adheres onto the surface of the sheet S to form the image, the condition of the sheet S being conveyed changes to affect the nipping forces of the roller pairs. In this regard, therefore, the rotation rates of the roller pairs can be effectively adjusted according to the present invention.

What is claimed is:

1. An image recording apparatus configured to form an image on a recording medium in a recording agent, comprising:
    a first conveyer, which is configured to convey the recording medium in a first direction;
    a recording unit, which is arranged in a downstream position with respect to the first conveyer along the first direction and configured to record the image on the recording medium being conveyed by the first conveyer;
    a second conveyer, which is arranged in a downstream position with respect to the recording unit along the first direction, includes a first roller pair to nip the recording medium, the first roller pair including a first driving roller to receive driving force from a drive source and a first driven roller arranged in a position opposite from the first driving roller, the first driven roller including a plurality of rollers, which are arranged in line along a second direction, the second direction being orthogonal to the first direction, the second conveyor being configured to have the first driving roller rotated by the driving force to convey the image-formed recording medium being nipped by the first roller pair; and
    a controller configured to:
        detect presence of a part of the formed image in a predetermined range along the second direction within the recording medium, the predetermined range corresponding to a range of the recording medium nipped by the first roller pair;
        identify at least one roller of the plurality of rollers in the first driven roller falling on a position to contact the predetermined range of the recording medium with the image formed thereon based on the detected presence of the part of the formed image in the predetermined range;
        set a rotation rate of the first driving roller based on the detected presence of the part of the formed image in the predetermined range; and
        control the first driving roller to rotate in the rotation rate set based on the detected presence of the part of the formed image in the predetermined range and convey the recording medium by the first roller pair; wherein the rotation rate of the first driving roller is set based on the at least one roller of the plurality of rollers in the first driven roller.

2. The image recording apparatus according to claim 1, wherein the controller is configured to detect a subset of the plurality of rollers in the first driven roller falling on the predetermined range to contact the part of the recording medium with the image formed thereon based on the detected presence of the part of the formed image in the predetermined range; and
    wherein the rotation rate of the first driving roller is set based on the detected subset of the plurality of rollers in the first driven roller.

3. The image recording apparatus according to claim 2, further comprising:
    an end position detector, which is configured to detect a position of an edge of the recording medium along the second direction,
    wherein the rotation rate of the first driving roller is set based on the position of the edge of the recording medium in the second direction detected by the end position detector.

4. The image recording apparatus according to claim 2, wherein the first conveyer includes a second roller pair to nip the recording medium, the second roller pair including a second driving roller to receive driving force from the drive source and a second driven roller arranged in a position opposite from the second driving roller, and is configured to have the second driving roller rotated by the driving force to convey the recording medium being nipped by the second roller pair;
    wherein the image recording apparatus further comprises a reverse conveyer, which reverses the recording medium with the image formed on a first side thereof and conveys the reversed recording medium toward the second roller pair to have an image formed on a second side being a side opposite from the first side of the recording medium;
    wherein the controller is configured to set a rotation rate of the second driving roller, when an image is being formed on the second side, based on the detected presence of the image formed in the predetermined range on the first side of the recording medium; and
    wherein the controller controls the second driving roller to rotate in the rotation rate set based on the detected presence of the image formed in the predetermined range on the first side of the recording medium and convey the recording medium by the second roller pair.

5. The image recording apparatus according to claim 4, further comprising:
a storing unit, which is configured to store an amount of recording agent used to form the image on the recording medium,
wherein the rotation rate of the second driving roller is set based on the amount of the recording agent used to form the image on the first side of the recording medium.

6. An image recording apparatus configured to form an image on a recording medium in a recording agent, comprising:
a first conveyer, which is configured to convey the recording medium in a first direction;
a recording unit, which is arranged in a downstream position with respect to the first conveyer along the first direction and configured to record the image on the recording medium being conveyed by the first conveyer;
a second conveyer, which is arranged in a downstream position with respect to the recording unit along the first direction, includes a first roller pair to nip the recording medium, the first roller pair including a first driving roller to receive driving force from a drive source and a first driven roller arranged in a position opposite from the first driving roller, and is configured to have the first driving roller rotated by the driving force to convey the image-formed recording medium being nipped by the first roller pair;
the first conveyer including a second roller pair to nip the recording medium, the second roller pair including a second driving roller to receive driving force from the drive source and a second driven roller arranged in a position opposite from the second driving roller, and is configured to have the second driving roller rotated by the driving force to convey the recording medium being nipped by the second roller pair;
a reverse conveyer, which reverses the recording medium with the image formed on a first side thereof and conveys the reversed recording medium toward the second roller pair to have an image formed on a second side being a side opposite from the first side of the recording medium; and
a controller configured to:
detect presence of a part of the formed image in a predetermined range along a second direction within the recording medium, the second direction being orthogonal to the first direction, the predetermined range corresponding to a range of the recording medium nipped by the first roller pair;
set the rotation rate of one of the first driving roller and the second driving roller, when the image is being formed on the second side of the recording medium, based on the detected presence of the image formed in the predetermined range on at least one of the first side and the second side of the recording medium; and
control the one of the first driving roller and the second driving roller to rotate in the rotation rate set based on the detected presence of the image formed in the predetermined range on the at least one of the first side and the second side of the recording medium and convey the recording medium by one of the first roller pair and the second roller pair.

7. The image recording apparatus according to claim 6, wherein the controller is configured to set the rotation rates of the first driving roller and the second driving roller, when the image is being formed on the second side of the recording medium, based on the detected presence of the image formed in the predetermined range on the first side of the recording medium; and
wherein the controller controls the first driving roller and the second driving roller to rotate in the rotation rates set based on the detected presence of the image formed in the predetermined range on the first side of the recording medium and convey the recording medium by the first roller pair and the second roller pair.

8. The image recording apparatus according to claim 6,
wherein detection of presence of the part of the formed image in the predetermined range includes detecting presence of the image formed in the predetermined range on the first side of the recording medium along the second direction, and detecting presence of the image formed in the predetermined range on the second side of the recording medium along the second direction; and
wherein setting the rotation rate of the first driving roller includes setting the rotation rate of the first driving roller, when an image is being formed on the second side of the recording medium, based on the detected presence of the image formed in the predetermined range on the first side of the recording medium and the detected presence of the image formed in the predetermined range on the second side of the recording medium.

9. The image recording apparatus according to claim 6, further comprising:
a storing unit, which is configured to store an amount of recording agent used to form the image on the recording medium,
wherein the controller sets the rotation rate of the one of the first driving roller and the second driving roller based on the amount of the recording agent used to form the image in the predetermined range on the at least one of the first side and the second side of the recording medium.

10. The image recording apparatus according to claim 9,
wherein the storing unit stores an amount of the recording agent used to form the image in the predetermined range on the first side of the recording medium and an amount of the recording agent used to form the image in the predetermined range on the second side of the recording medium; and
wherein the controller is configured to set the rotation rate of the first driving roller based on the amount of the recording agent used to form the image in the predetermine range on the first side of the recording medium and the amount of the recording agent used to form the image in the predetermine range on the second side of the recording medium.

11. An image recording apparatus configured to form an image on a recording medium in a recording agent, comprising:
a first conveyer, which is configured to convey the recording medium in a first direction;
a recording unit, which is arranged in a downstream position with respect to the first conveyer along the first direction and configured to record the image on the recording medium being conveyed by the first conveyer;
a second conveyer, which is arranged in a downstream position with respect to the recording unit along the first direction, includes a first roller pair to nip the recording medium, the first roller pair including a first driving roller to receive driving force from a drive source and a first driven roller arranged in a position opposite from the first driving roller, and is configured to have the first driving roller rotated by the driving force to convey the image-formed recording medium being nipped by the first roller pair;

the first conveyer including a second roller pair to nip the recording medium, the second roller pair including a second driving roller to receive driving force from the drive source and a second driven roller arranged in a position opposite from the second driving roller, and is configured to have the second driving roller rotated by the driving force to convey the recording medium being nipped by the second roller pair;

a reverse conveyer, which reverses the recording medium with the image formed on a first side thereof and conveys the reversed recording medium toward the second roller pair to have an image formed on a second side being a side opposite from the first side of the recording medium; and a controller configured to:
  detect presence of a part of the formed image in a predetermined range along a second direction within the recording medium, the second direction being orthogonal to the first direction, the predetermined range corresponding to a range of the recording medium nipped by the first roller pair;
  set the rotation rate of one of the first driving roller and the second driving roller, when the image is being formed on the second side of the recording medium, based on the detected presence of the image formed in the predetermined range on at least one of the first side and the second side of the recording medium; and
  control the one of the first driving roller and the second driving roller to rotate in the rotation rate set based on the detected presence of the image formed in the predetermined range on the at least one of the first side and the second side of the recording medium and convey the recording medium by one of the first roller pair and the second roller pair.

12. The image recording apparatus according to claim 11, wherein the first driven roller in the first roller pair includes a plurality of rollers, which are arranged in line along the second direction;

wherein the controller is configured to identify at least one roller of the plurality of rollers in the first driven roller falling on a position to contact the predetermined range of the recording medium with the image formed thereon based on the detected presence of the part of the formed image in the predetermined range; and wherein the rotation rate of the first driving roller is set based on the at least one roller of the plurality of rollers in the first driven roller.

13. The image recording apparatus according to claim 12, wherein the controller is configured to detect a subset of the plurality of rollers in the first driven roller falling on the predetermined range to contact the part of the recording medium with the image formed thereon based on the detected presence of the part of the formed image in the predetermined range; and wherein the rotation rate of the first driving roller is set based on the detected subset of the plurality of rollers in the first driven roller.

14. The image recording apparatus according to claim 13, further comprising:
  an end position detector, which is configured to detect a position of an edge of the recording medium along the second direction,
  wherein the rotation rate of the first driving roller is set based on the position of the edge of the recording medium in the second direction detected by the end position detector.

15. The image recording apparatus according to claim 11, wherein the controller is configured to set the rotation rates of the first driving roller and the second driving roller, when the image is being formed on the second side of the recording medium, based on the detected presence of the image formed in the predetermined range on the first side of the recording medium; and wherein the controller controls the first driving roller and the second driving roller to rotate in the rotation rates set based on the detected presence of the image formed in the predetermined range on the first side of the recording medium and convey the recording medium by the first roller pair and the second roller pair.

16. The image recording apparatus according to claim 11, wherein detection of presence of the part of the formed image in the predetermined range includes detecting presence of the image formed in the predetermined range on the first side of the recording medium along the second direction, and detecting presence of the image formed in the predetermined range on the second side of the recording medium along the second direction; and wherein setting the rotation rate of the first driving roller includes setting the rotation rate of the first driving roller, when an image is being formed on the second side of the recording medium, based on the detected presence of the image formed in the predetermined range on the first side of the recording medium and the detected presence of the image formed in the predetermined range on the second side of the recording medium.

17. The image recording apparatus according to claim 11, further comprising:
  a storing unit, which is configured to store an amount of recording agent used to form the image on the recording medium,
  wherein the controller sets the rotation rate of the one of the first driving roller and the second driving roller based on the amount of the recording agent used to form the image in the predetermined range on the at least one of the first side and the second side of the recording medium.

18. The image recording apparatus according to claim 17, wherein the storing unit stores an amount of the recording agent used to form the image in the predetermined range on the first side of the recording medium and an amount of the recording agent used to form the image in the predetermined range on the second side of the recording medium; and wherein the controller is configured to set the rotation rate of the first driving roller based on the amount of the recording agent used to form the image in the predetermine range on the first side of the recording medium and the amount of the recording agent used to form the image in the predetermine range on the second side of the recording medium.

* * * * *